United States Patent

Edwards et al.

(10) Patent No.: US 6,526,501 B2
(45) Date of Patent: **\*Feb. 25, 2003**

(54) ADAPTER FOR A MICROPROCESSOR

(75) Inventors: David Alan Edwards, Bristol (GB); Andrew Michael Jones, Bristol (GB)

(73) Assignee: STMicroelectronics Limited, Almondsbury Bristol (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/268,071

(22) Filed: Mar. 12, 1999

(65) Prior Publication Data

US 2002/0188822 A1 Dec. 12, 2002

(30) Foreign Application Priority Data

Mar. 15, 1998 (GB) ............................................ 9805486

(51) Int. Cl.$^7$ ................................................ G06F 9/44
(52) U.S. Cl. ...................................... 712/227; 710/260
(58) Field of Search .......................... 711/131; 710/48, 710/5, 260; 700/28; 709/225; 717/128, 4; 714/38; 712/227

(56) References Cited

U.S. PATENT DOCUMENTS

| | | |
|---|---|---|
| 3,939,455 A | 2/1976 | Toyosawa |
| 4,306,285 A | 12/1981 | Moriya et al. |
| 4,315,308 A | 2/1982 | Jackson |
| 4,881,228 A | 11/1989 | Shouda |
| 4,964,033 A | 10/1990 | Williams |
| 5,243,698 A | 9/1993 | May |
| 5,298,921 A | 3/1994 | Gulick |
| 5,353,419 A | 10/1994 | Touch et al. |

(List continued on next page.)

FOREIGN PATENT DOCUMENTS

| | | | |
|---|---|---|---|
| EP | 0 652 516 | 5/1995 | |
| EP | 0720092 A1 | * 3/1996 | |
| EP | 0820011 A2 | 1/1998 | |
| EP | 0840223 A1 | 6/1998 | ........... G06F/11/00 |
| WO | WO 91/17505 | 5/1991 | ........... G06F/11/26 |
| WO | WO 96/38789 A2 | 12/1996 | |

OTHER PUBLICATIONS

Lawday, G., "Fully Buffered Real–Time Ice For Multiprocessing," Electronic Engineering, vol. 63, No. 770, Feb. 1, 1991, p. 67, 69, 71, XP000208113.

(List continued on next page.)

*Primary Examiner*—Zarni Maung
*Assistant Examiner*—Jungwon Chang
(74) *Attorney, Agent, or Firm*—Wolf, Greenfield & Sacks, P.C.; James H. Morris; Robert A. Skrivanek, Jr.

(57) ABSTRACT

An adapter device for assisting debugging of a microprocessor on a single integrated circuit chip, the integrated circuit chip comprising an on-chip CPU with a plurality of registers, a communication bus providing a parallel communication path between the CPU and a first memory local to the CPU and an external communication port connected to the said bus on the integrated circuit chip, the communication port having an internal connection to the said bus of an internal parallel signal format and an external connection to the adapter unit of a first external format less parallel than the said internal format; the adapter device comprising a first communication unit for connection to the communication port with the first external format; a second communication unit for connection to an external computer device with a second external format having a higher latency than the first external format; a second memory local to the adapter device; and a processing unit local to the adapter device and operable: (a) in a first mode to translate between the first external format and the second external format to allow the external computer device to communicate directly with the communication port; (b) in a second mode to connect the second communication unit to the second memory to allow the external computer device to access the second memory; and (c) in a third mode to execute instructions stored in the second memory to transmit data via the first communication unit to the communication port.

12 Claims, 14 Drawing Sheets

U.S. PATENT DOCUMENTS

| | | | |
|---|---|---|---|
| 5,426,769 A | | 6/1995 | Pawloski |
| 5,440,698 A | * | 8/1995 | Sindhu et al. ............... 706/225 |
| 5,442,800 A | | 8/1995 | Okamura |
| 5,525,971 A | | 6/1996 | Flynn |
| 5,544,311 A | | 8/1996 | Harenberg et al. |
| 5,574,932 A | | 11/1996 | Sato et al. |
| 5,581,779 A | | 12/1996 | Hall et al. |
| 5,586,336 A | | 12/1996 | Nakamura et al. |
| 5,669,012 A | | 9/1997 | Shimizu et al. |
| 5,687,179 A | | 11/1997 | Whetsel, Jr. et al. |
| 5,701,488 A | | 12/1997 | Mulchandani et al. ...... 395/704 |
| 5,724,603 A | | 3/1998 | Nishiguchi |
| 5,892,897 A | | 4/1999 | Carlson |
| 5,928,354 A | | 7/1999 | Umeki et al. |
| 5,930,819 A | * | 7/1999 | Hetherington et al. ...... 711/131 |
| 5,943,498 A | * | 8/1999 | Yano et al. ................. 717/128 |
| 5,978,937 A | | 11/1999 | Miyamori et al. |
| 6,134,481 A | * | 10/2000 | Warren ........................ 700/28 |
| 6,175,914 B1 | | 1/2001 | Mann |
| 6,185,732 B1 | * | 2/2001 | Mann et al. ................... 717/4 |
| 6,189,052 B1 | * | 2/2001 | Nilsson et al. ................ 710/48 |
| 6,189,140 B1 | * | 2/2001 | Madduri ........................ 717/4 |
| 6,301,657 B1 | | 10/2001 | Jones et al. |
| 6,314,530 B1 | * | 11/2001 | Mann .......................... 714/38 |
| 6,356,960 B1 | * | 3/2002 | Jones et al. .................... 710/5 |

OTHER PUBLICATIONS

Standard Search Report dated Sep. 23, 1997 in United Kingdom application Nos. GB9622684.0 and GB9627102.8.

Byte, vol. 19, No. 6, Jun. 1, 1994, pp. 57–64, Multimedia Powerhouse, Karl M. Guttag.

Standard Search Report dated Sep. 23, 1997 in United Kingdom application Nos. GB9622684.0 and GB9627089.7.

Tocci and Widmer, "Digital Systems, Principles and Applications", Printice Hall, pp. 384–392 Seventh edition, Jun. 27, 1997.

Standard Search Report from European Patent Office dated Oct. 9, 1998.

Gonzales, D.R., "Using The Motorola DSP On–Chip Emulation Circuit," Wescon Technical Papers, vol. 36, Nov. 17, 1992, pp. 680–686, XP000350135.

Beckers, F., "Umstieg Auf IDT's R3041 Risc–Prozessoren," F & M Feinwerktechnik Miktrotechnik Mikroelektronik, vol. 104, No. 5, May 1, 1996, pp. 344/345, XP000592216.

* cited by examiner

SLICE 0 – HOSTED
SLICE 1 – CACHED IN ADAPTOR
SLICE 2 – HOSTED

ADAPTER FOR A MICROPROCESSOR

BACKGROUND OF THE INVENTION

The invention relates to adapter devices, especially adapter devices for use in debugging.

Single chip microcomputers are known including external communication ports so that the chip may be connected in a network, including for example connection to a host microcomputer for use in debugging routines. Such systems are also known in which each of the interconnected microcomputer chips has its own local memory. For speed of communication on on-chips it is common for bit packets to be transmitted between modules on a chip in a bit parallel format. However problems arise in both power consumption and available pin space in providing for external off-chip communications in the same parallel bit format as that used on-chip. Such microcomputers require access to instruction or code sequences and for efficient operation it is desirable for the instructions to be retrievable from locations within the address space of the CPU. One approach described in co-pending European patent application number 97308517.8 is to provide an on-chip external communication port forming part of the memory address space of the CPU from which instructions may be fetched and which translates between a parallel format on-chip and a less parallel format for off-chip communications. By itself, however, this approach does not address the following problem. When an external computer is linked to the external communication port, the performance of the system may be poor if a single communication protocol runs all the way from the chip to the external computer. This is because the on-chip protocol is typically a low-level protocol of a lower latency than the protocols that are most suitable for use at the external computer. Also, the on-chip protocol can be electrically fragile, and unreliable if run over greater lengths than around 1.5 m. This imposes a physical limitation on the debugger if the on-chip protocol is used all the way from the chip to the external computer.

SUMMARY OF THE INVENTION

According to the present invention there is provided an adapter device for assisting debugging of a microprocessor on a single integrated circuit chip, the integrated circuit chip comprising an on-chip CPU with a plurality of registers, a communication bus providing a parallel communication path between the CPU and a first memory local to the CPU, and an external communication port connected to the said bus on the integrated circuit chip, the communication port having an internal connection to the said bus of an internal parallel signal format and an external connection to the adapter unit of a first external format less parallel than the said internal format; the adapter device comprising a first communication unit for connection to the communication port with the first external format; a second communication unit for connection to an external computer device with a second external format having a higher latency than the first external format; a second memory local to the adapter device; and a processing unit local to the adapter device and operable: (a) in a first mode to translate between the first external format and the second external format to allow the external computer device to communicate directly with the communication port; (b) in a second mode to connect the second communication unit to the second memory to allow the external computer device to access the second memory; and (c) in a third mode to execute instructions stored in the second memory to transmit data via the first communication unit to the communication port.

The communications port suitably forms part of the memory address space of the CPU. Then, the second memory preferably forms part of the address space allocated to the port. The adapter device preferably stores data specifying the mapping of the memory address space formed by the port on to the memory address space in the second memory. The external computer suitably has a third memory which forms part of the address space allocated to the port. Then the adapter device suitably stores data specifying the mapping of the memory address space formed by the port on to the memory address space in the third memory.

The adapter device may comprise a third communication unit for connection to a second external computer device with the second external format. The processing unit local to the adapter device is suitably operable to allow the second external computer device to communicate directly with the communication port.

BRIEF DESCRIPTION OF THE DRAWINGS

The present invention will now be described by way of example with reference to the accompanying drawings in which.

DETAILED DESCRIPTION OF THE PREFERRED EMBODIMENT

Figure 1:
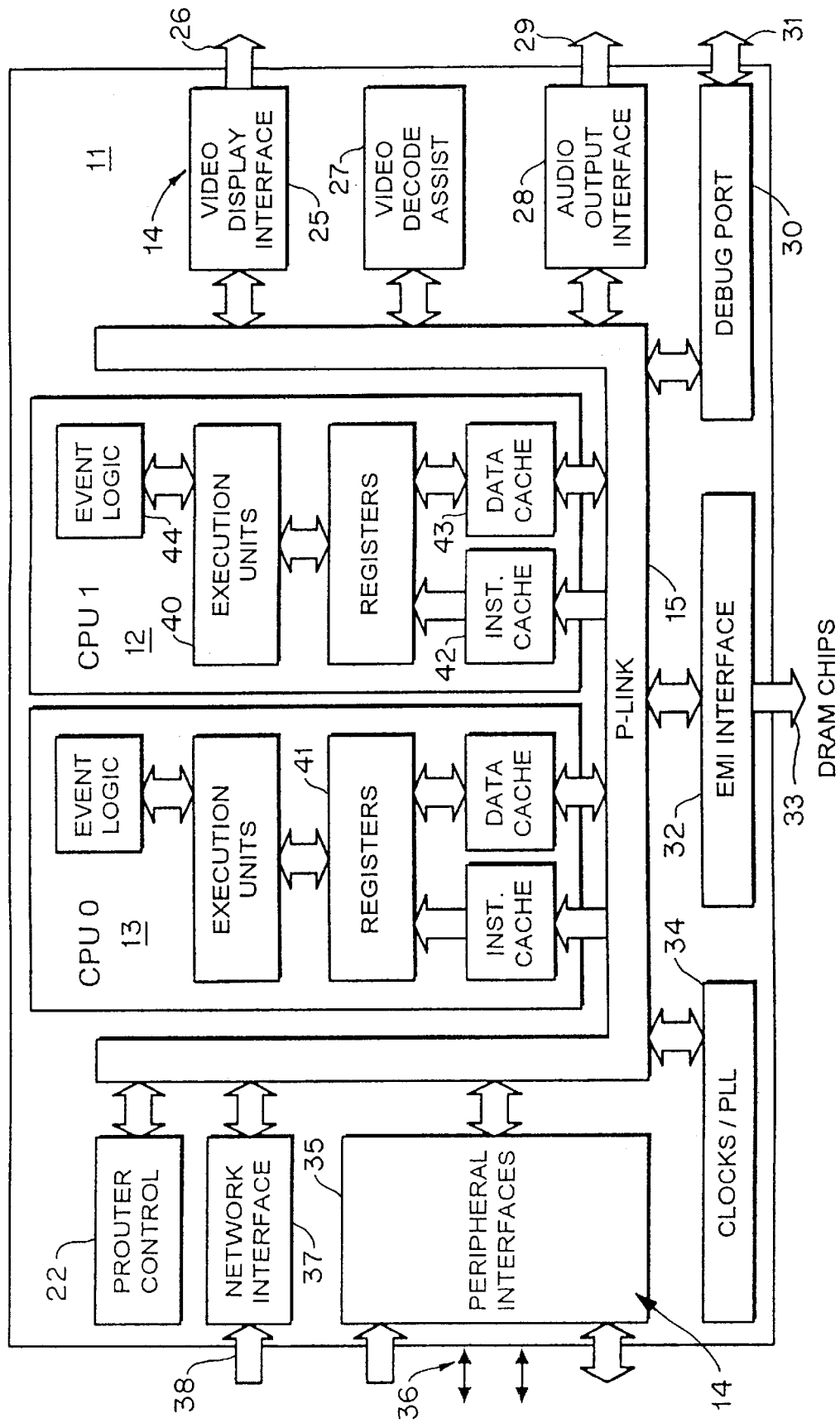
FIG. 1 is a block diagram of a microcomputer chip in accordance with the present invention.
Figure 2:
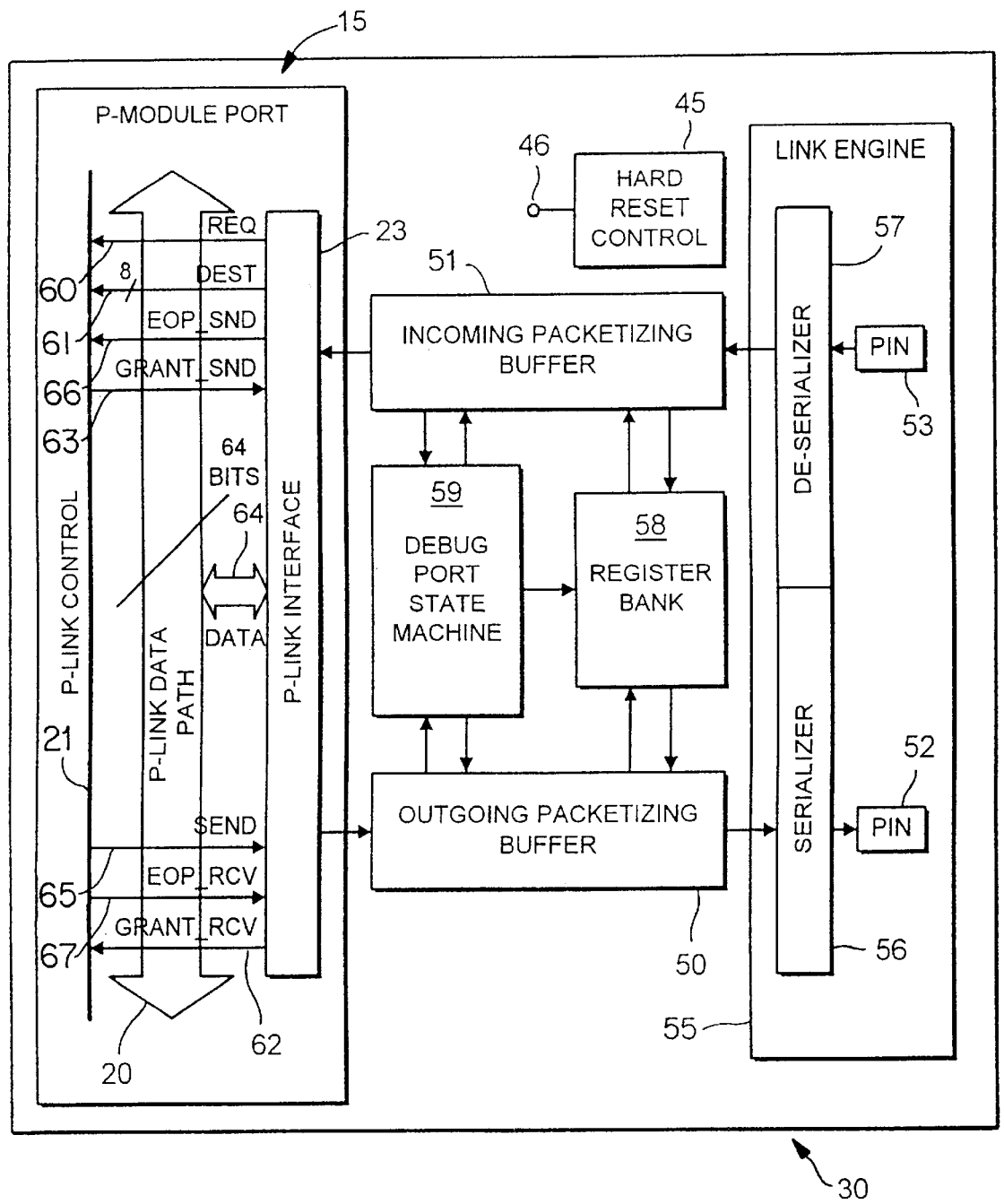
FIG. 2 shows more detail of a debug port of the microcomputer of FIG. 1.

The preferred embodiment illustrated in FIG. 1 comprises a single integrated circuit chip 11 on which is provided two CPU circuits 12 and 13 as well as a plurality of modules 14. The CPUs 12 and 13 as well as each module 14 are interconnected by a bus network 15 having bi-directional connections to each module. In this example the bus network is referred to as a P-link consisting of a parallel data bus 20 as shown in FIG. 2 together with a dedicated control line 21 provided respectively for each module so as to link the module to a P-link control unit 22. Each module is provided with a P-link interface 23 incorporating a state machine so as to interchange control signals between the respective P-link control line 21 and the interface 23 as well as transferring data in two opposing directions between the data bus 20 and the interface 23.

In the example shown in FIG. 1, the various modules 14 include a video display interface 25 having an external connection 26, a video decode assist circuitry 27, an audio output interface 28 having an external connection 29, a debug port 30 having an external connection 31, an external memory interface 32 having an external bus connection 33 leading to an external memory, clock circuitry 34, various peripheral interfaces 35 provided with a plurality of bus and serial wire output connections 36, a network interface 37 with an external connection 38 as well as the P-link control unit 22. The two CPU units 12 and 13 of this example are generally similar in construction and each includes a plurality of instruction execution units 40, a plurality of registers 41, an instruction cache 42 and a data cache 43. In this example each CPU also includes event logic circuitry 44 connected to the execution units 40.

The CPUs can be operated in conventional manner receiving instructions from the instruction caches 42 on chip and effecting data read or write operations with the data cache 43 on chip. Additionally external memory accesses for read or write operations may be made through the external memory interface 32 and bus connection 33. An important provision in this example is the debug port 30 which is described in more detail in FIGS. 2 to 5. As shown in FIG. 2, this circuitry includes a hard reset controller 45 connected to a hard reset pin 46. The controller 45 is connected to all modules on the chip shown in FIG. 1 so that when the hard reset signal is asserted on pin 46 all circuitry on the chip is reset.

As will be described below, this port 30 provides an important external communication for use in debugging procedures. The on-chip CPUs 12 and 13 may obtain instruction code for execution from an external source communicating through the port 30. Communications on the P-link system 15 are carried out in bit parallel format. Transmissions on the data bus 20 of the P-link 15 may be carried out in multiple byte packets, for example 35 bytes for each packet, so that one packet is transmitted in five consecutive eight byte transfers along the P-link each transfer being in bit parallel format. The port 30 is arranged to reduce the parallelism of packets obtained from the P-link 15 so that they are output in bit serial format through the output 31 or alternatively in a much reduced parallel format relative to that used on the P-link 15 so as to reduce the number of external connection pins needed to implement the external connection 31.

The structure of the port 30 will now be described with reference to FIGS. 2 to 5.

In this example the port 30 comprises an outgoing packetising buffer 50 connected to the P-link interface 23 as well as an incoming packetising buffer 51 connected to the interface 23. On the output side, the external connection 31 is in this case formed by an output pin 52 and an input pin 53. The port in this case effects a full transition between parallel format from the data bus 20 to bit serial format for the input and output pins 52 and 53. The pins 52 and 53 are connected as part of an output link engine 55 which also incorporates serialiser 56 and de-serialiser 57 connected respectively to the outgoing packetising buffer 50 and the incoming packetising buffer 51. Between the buffers 50 and 51 are connected by bi-directional connections a register bank 58 and a debug port state machine 59. The function of the port 30 is to translate bit packets between the internal on-chip parallel format and the external bit serial format. In addition it allows packets which are input through pin 53 to access the registers 58 in the port without use of the P-link system 15. Equally packets on the P-link system 15 can access the registers 58 of the port without using the external pins 52 or 53.

Figure 6:
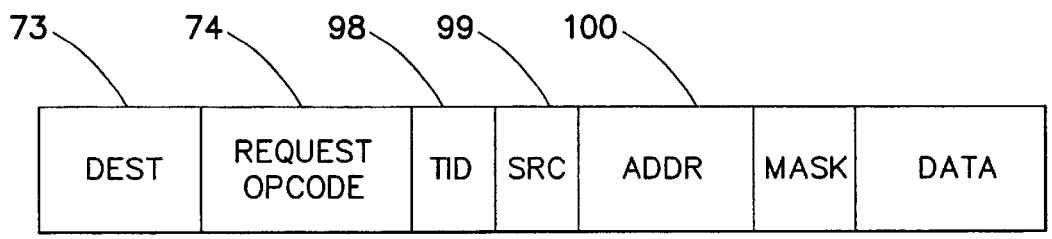
FIG. 6 shows the format of a digital signal request packet which may be used in the microcomputer of FIG. 1.
Figure 7:
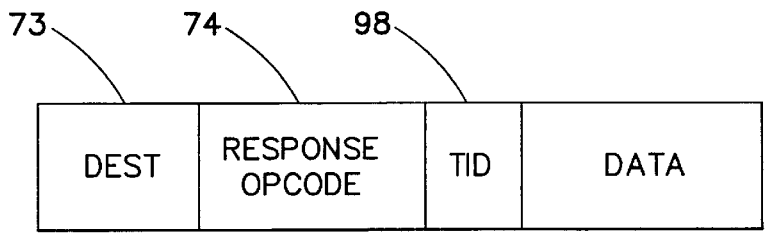
FIG. 7 shows the format of a digital signal response packet which may be used in the microcomputer of FIG. 1.
Figure 8:
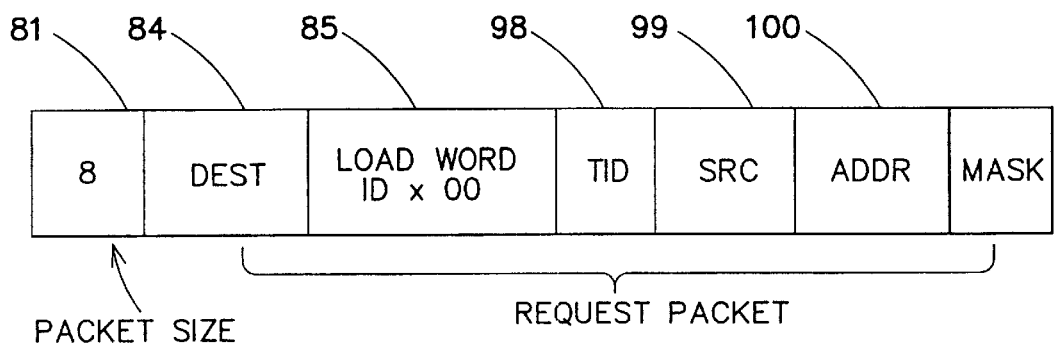
FIG. 8 shows one example of a serial request packet which may be output or input through the port of FIG. 2.

The format of the multi-bit packets used in the microcomputer system is illustrated by way of example in FIGS. 6, 7 and 8. When a packet is to be output from the port 30 from one of the modules 14 connected to the P-link 15, the module transmits the parallel representation of the packet along the data bus 20. The packet may comprise a plurality of eight byte transfers as already described. Each module 14, including the port 30, has a similar P-link interface 23 and the operation to take data from the bus 20 or to put data onto the bus 20 is similar for each. When a module has a packet to send to another module, for example to the port 30, it first signals this by asserting a request signal on line 60 to the dedicated link 21 connecting that module to the central control 22. It also outputs an eight bit signal on a destination bus 61 to indicate to the control the intended destination of the packet it wishes to transmit. It will be understood that the P-link 21 is itself a bus. A module such as the port 30, which is able to receive a packet from the bus 20 will assert a signal "grant receive" on line 62 to be supplied on the dedicated path 21 to the central control 22 regardless of whether a packet is available to be fed to that destination or not. When the central control 22 determines that a module wishes to send a packet to a destination and independently the destination has indicated by the signal on line 22 that it is able to receive a packet from the bus 20, the control 22 arranges for the transfer to take place. The control 22 asserts the "grant send" signal 63 via the dedicated line 21 to the appropriate interface 23 causing the sending module to put the packet onto the P-link data path 20 via the bus 64 interconnecting the interface 23 with the data bus 20. The control 22 then asserts the "send" signal 65 of the receiver which signals to it that it should accept the transfers currently on the P-link data bus 20. The packet transmission concludes when the sender asserts its "end of packet send" line 66 concurrently with the last transfer of packet data on the bus 20. This signal is fed on the dedicated path 21 to the central control 22 and the control then asserts the "end of packet received" signal 67 to the receiving module which causes it to cease accepting data on the P-link data bus 20 after the current transfer has been received.

The parallel to serial translation which takes place in the port 30 has a one to one equivalence between the parallel and serial packets so that all data contained in one packet form is contained in the other, and the protocol used over the P-link is retained in the serial packetisation. The translation therefore involves identifying the type of the packet and copying across fields of the packet in a manner determined by the type.

Figure 4:
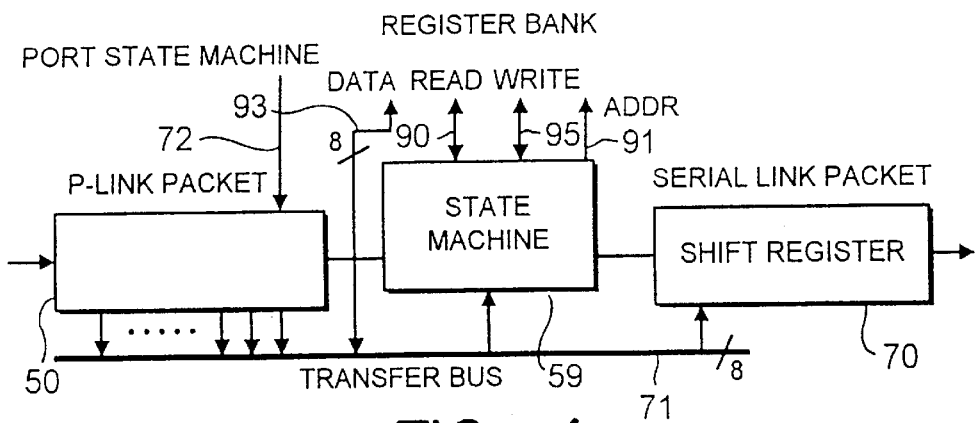
FIG. 4 shows the output of a digital signal packet to the port of FIG. 2.

When a packet is input to the outgoing packetising buffer 50 from the data bus 20, the packet is held in its entirety as the buffer is 35 bytes long in order to hold the longest packet. As shown in FIG. 4, buffer 50 is connected to the port state machine 59 and to a shift register 70 by a transfer bus 71. The shift register 70 is connected to the serialiser 56. The state machine 59 provides input signals 72 to the buffer 50 to copy specific bytes from the P-link packet onto the transfer bus 71 under the control of the state machine 59. Firstly the most significant byte of the packet, which holds the destination header 73, is placed onto the byte wide transfer bus 71. The state machine 59 compares this value with those values which indicate that the packet is destined for the shift register and output serial link. If the packet is destined for the output serial link, the state machine causes the next byte 74 of the packet (which is the operation code indicating the type of packet) to be placed on the transfer bus 71. From the opcode 74 which is supplied to the state machine 59 on the transfer bus 71, the state machine determines the length and format of the packet derived from the data bus 20 and therefore determines the length and format of the serial packet which it has to synthesise. The state machine 59 outputs a byte which indicates the serial length packet onto the transfer bus 71 and this is shifted into the first byte position of the shift register 70. The state machine 59 then causes bytes to be copied from the buffer 50 onto the bus 71 where they are shifted into the next byte position in the shift register 70. This continues until all the bytes from the buffer 50 have been copied across. The order of byte extractions from the buffer 50 is contained in the state machine 59 as this determines the reformatting in serial format. The serial packet may then be output by the output engine 55 via pin 52 to externally connected circuitry as will be described with reference to FIGS. 11 to 14.

Figure 3:
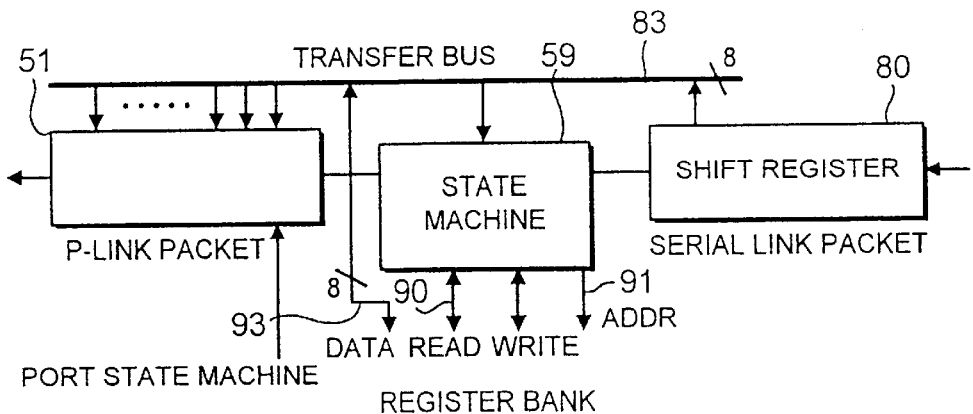
FIG. 3 shows input of a digital signal packet through the port of FIG. 2.

When a serial packet is input through pin 53 to the port 30, the translation is dealt with as follows. Each byte is passed into the shift register 80 forming a packetising buffer. Such a serial packet is shown in FIG. 8 in which the first byte 81 indicates the packet size. This will identify the position of the last byte of the packet. Referring to FIG. 3, the register 80 copies bytes in the simple order they are shifted out of the shift register onto a transfer bus 83 under the control of the state machine 59. The state machine 59 compares the destination byte 84 of the packet with those values which indicate that the packet is destined for the P-link system 15. The state machine 59 causes the next byte 85 of the packet to be placed on the transfer bus in order to indicate the type of packet (also known as the opcode) and from this the state machine checks the length and format of the serial link packet and those of the P-link packet which it has to synthesise. The state machine 59 causes bytes to be shifted out of the register 80 onto bus 83 where they are copied into a P-link packet buffer 51. This continues until all serial link bytes have been copied across and the positions in which the bytes are copied into the buffer 86 from the shift register 80 is determined by setting of the state machine 59. This indicates to the interface 23 that a packet is ready to be put on the bus 20 and the interface communicates through the dedicated communication path 21 with the central control 22 as previously described. When the P-link system 15 is ready to accept the packet the interface responds by copying the first eight bytes of the packet onto the data path 20 on the following clock cycle (controlled by clock 34). It copies consecutive eight byte parts of the packet onto the bus 20 on subsequent clock cycles until all packet bytes have been transmitted. The final eight bytes are concurrent with the end of packet send signal being asserted by the interface on line 66.

As already described, an incoming packet (either parallel or serial) to the port 23 may wish to access port registers 58. When the destination byte 84 of an incoming serial bit packet from the pin 53 indicates that the packet is destined to access registers 58, the bit serial packet is changed to a P-link packet in buffer 51 as already described but rather than being forwarded to the P-link interface 23, it is used to access the register bank 58. One byte (the opcode) of the packet will indicate whether the register access is a read or write access. If the access is a read, then the state machine 59 will output a read signal on line 90 shown in FIG. 5. Concurrent with this the least significant four bits of the packet address field are placed on lines 91. Some cycles later the register bank 58 under control of a control block 92 will copy the value in the addressed register onto the data bus 93 one byte at a time, each byte on a successive clock cycle. Each byte on the data line 93 is latched into the outgoing buffer 50 and under control of the state machine 59, the data read from the register is synthesised into a P-link packet in buffer 50 and specified as a "load response". The destination field for this response packet is copied from a "source" field of a requesting bit serial packet. A transaction identifier (TID) which is also provided in each packet, is also copied across. A type byte of the response packet is formed from the type byte of the request packet and consequently a response P-link packet is formed in the outgoing buffer 50 in response to a request packet which was input from an external source to pin 53.

If the type of access for registers 58 is a write access then the write line 95 is asserted by the state machine 59 together with the address line 91. Some cycles later the least significant byte of the data is copied from an operand field of the packet in buffer 51 onto the data bus 93. On the following seven cycles bytes of successive significance are copied to the registers 58 until all eight bytes have been copied. A response packet is then synthesised in register 50 except that "store response" packets do not have data associated with them and comprise only a destination byte, a type byte and a transaction identifier byte. This response packet is translated into a bit serial response packet as previously described, loaded into shift register 70 and output through pin 52 to indicate to the source of the write request that a store has been effected.

Figure 5:
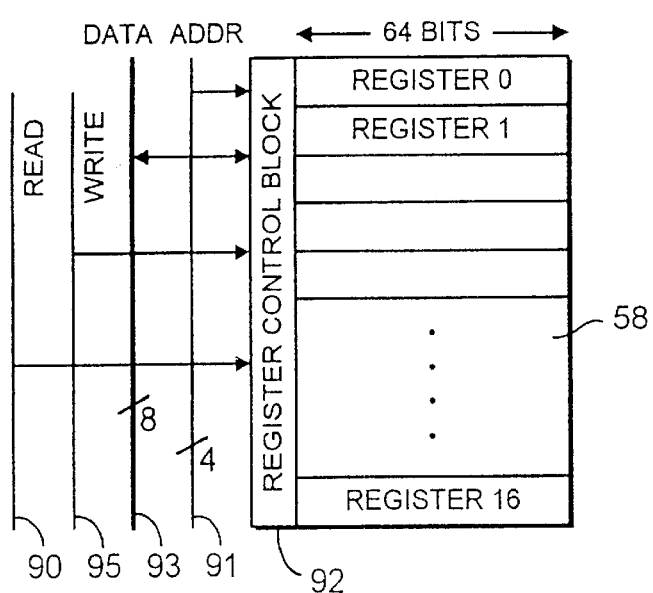
FIG. 5 shows accessing of registers in the port of FIG. 2.

Similarly if the destination byte of a packet received from the P-link system 15 by the port 30 is examined and indicates that the packet is destined to access registers 58 in the port 30, a similar operation is carried out. Rather than being forwarded to the bit serial register 70, the type of field of the packet is used to determine whether the access is a read or write access. If the access is a read then the read line 90 of FIG. 5 is asserted by the state machine 59 and the least significant four bits of the packets address field are placed on the address line 91. Two cycles later the register bank copies the value held in the register which has been addressed onto the data line 93 one byte at a time each on successive cycles. This is latched into buffer 51 and the state machine synthesises a P-link packet which is specified as a "read response" packet. The destination field for this response packet is copied from the source field of the requesting bit serial packet. The transaction identifier is also copied across. The type byte of the response packet is formed from the type byte of the request packet.

If the type of access required is a write access then state machine 59 asserts the write line 95 together with the address line 91. Some cycles later the least significant byte of the data is copied from the operand field of the packet in buffer 50 to the data line 93. On the following seven cycles bytes of successive significance are copied to the data lines 93 and copied into the registers until all bytes have been copied. A response packet is then synthesised as previously described except that "store response" packets do not have data associated with them and comprise only a destination byte, a type byte and a transaction identifier byte. This response packet is then forwarded to the P-link interface 23 where it is returned to the issuer of the request packet which have been input through the P-link interface 93 in order to access the port registers 58. From the above description it will be understood that the packet formats shown in FIGS. 6, 7 and 8 include packets that form a request or a response to a read or write operation. In addition to each packet including a destination indicator for the packet (numeral 73 in FIGS. 6 and 7 or numeral 84 in FIG. 8) the packets include a (TID) transaction identifier 98 and an indication of the source 99. The packets may need to identify a more specific address at a destination. For this reason an address indicator 100 may be provided. As already described in relation to register access at the port 30, the destination identifies the port although the address 100 is used to indicate the specific register within the port. The Destination field is a one byte field used to route the packet to the target subsystem or module connected to the P link 15. For request packets it is the most significant byte of the address to be accessed. For a response packet it identifies the subsystem which issued the request. The source field is a one byte field which is used as a return address for a response packet. The Address field is provided by the least significant 3 bytes of the request address. The TID field is used by the requester to associate responses with requests.

It will be appreciated that by using a bit serial port low cost access is provided to a chip, requiring only a small number of pins for access, and may be particularly used for debugging a CPU by use of an external host.

In this example each CPU 12 and 13 is arranged to execute an instruction sequence in conventional manner. The instruction set will include a plurality of conventional instructions for a microcomputer but this example also includes an instruction to send an "event". An "event" is an exceptional occurrence normally caused by circumstances external to a thread of instructions. Events can be used to have similar effect as an "interrupt" or "a synchronous trap". Events may be prioritised in that they can cause a change in the priority level at which the CPU executes. An event may be sent by execution of an event instruction although hardware in the form of the event logic 44 can carry out the function of some events without the execution of instructions in a service or handler routine.

Events which originate from execution of an instruction by a CPU are caused by execution of the event instruction. This can be used to send an "event" to a CPU such as one or other of the CPUs 12 or 13 on the same chip or it may be used to send an event to a CPU on a different chip through an external connection. The CPU which executes the event instruction may also send an event to a further module connected to the P-link system 15. The event instruction has two 64 bit operands, the event number and the event operand. With regard to the event number 0–63, bit 15 is used to determine whether or not the event is a "special event". When bit 15 is set to 1, bits 0–14 are used to define the type of special event. Bits 16–63 of the event number are used to identify the destination address of the CPU or module to receive the special event. The types of special event are set out below:

| Event Name | EN.CODE | EN.OPERAND | Function | |
|---|---|---|---|---|
| EVENT.RUN | 1 | Ignored | Resumes execution from suspended state of the receiving CPU | |
| EVENT.RESET | 3 | Ignored | Generate a reset event on the receiving CPU | |
| EVENT.SUSPEND | 5 | Ignored | Suspends execution of the receiving CPU | |
| EVENT.SET RESET.HANDLER | 7 | Boot address | RESET.HANDLER ⇐ RESET. SHADOW HANDLER RESET.HANDLER ⇐ boot address | |

These special events may be sent from one CPU 12 or 13 to the other or alternatively they may be sent through the debug port 30 from an external host to either of the CPUs 12 or 13 on chip. The "event" will be sent as a bit packet of the type previously described.

In response to a special event, either CPU 12 or 13 can be made to cease fetching and issuing instructions and enter the suspended state.

When an EVENT.SUSPEND is received by a CPU it sets a suspend flag. This flag is OR-ed with the state of the suspend pin to determine the execution stage of the CPU.

The suspended state may be entered by:

Asserting the SUSPEND PIN. This stops all CPUs on the chip.

Sending an EVENT.SUSPEND to a CPU. This suspends only the receiving CPU.

The suspended state may be exited by either of:

Changing an external SUSPEND PIN from the asserted to negated stage. This causes all CPU(s) which do not have their suspend flags set to resume execution.

Sending an EVENT.RUN special event to a CPU. This clears the suspend flag. If the SUSPEND PIN is negated this causes the receiving CPU to resume execution.

Entering the suspended state causes a CPU to drain the execution pipelines. This takes an implementation defined period of time. While a CPU is suspended its execution context may be changed in any of the following ways:

The reset address control register RESET.HANDLER may be changed.

The CPU may be reset.

External memory may be changed by DMA, e.g. using the debug link 30.

At hard reset, (that is reset of all state on the chip) if the SUSPEND PIN is asserted at the active edge of the hard reset the CPU(s) state will be initialised but will not boot. The CPUs will boot from the addresses contained in the RESET.HANDLER set prior to the reset event when they enter the running state.

The EVENT.RESET causes the receiving CPU to perform a soft reset. This type of reset causes the key internal state to be initialised to known values while saving the old values in dedicated shadow registers such as to enable debugging software to determine the state of the CPU when the reset took place.

Figure 9:
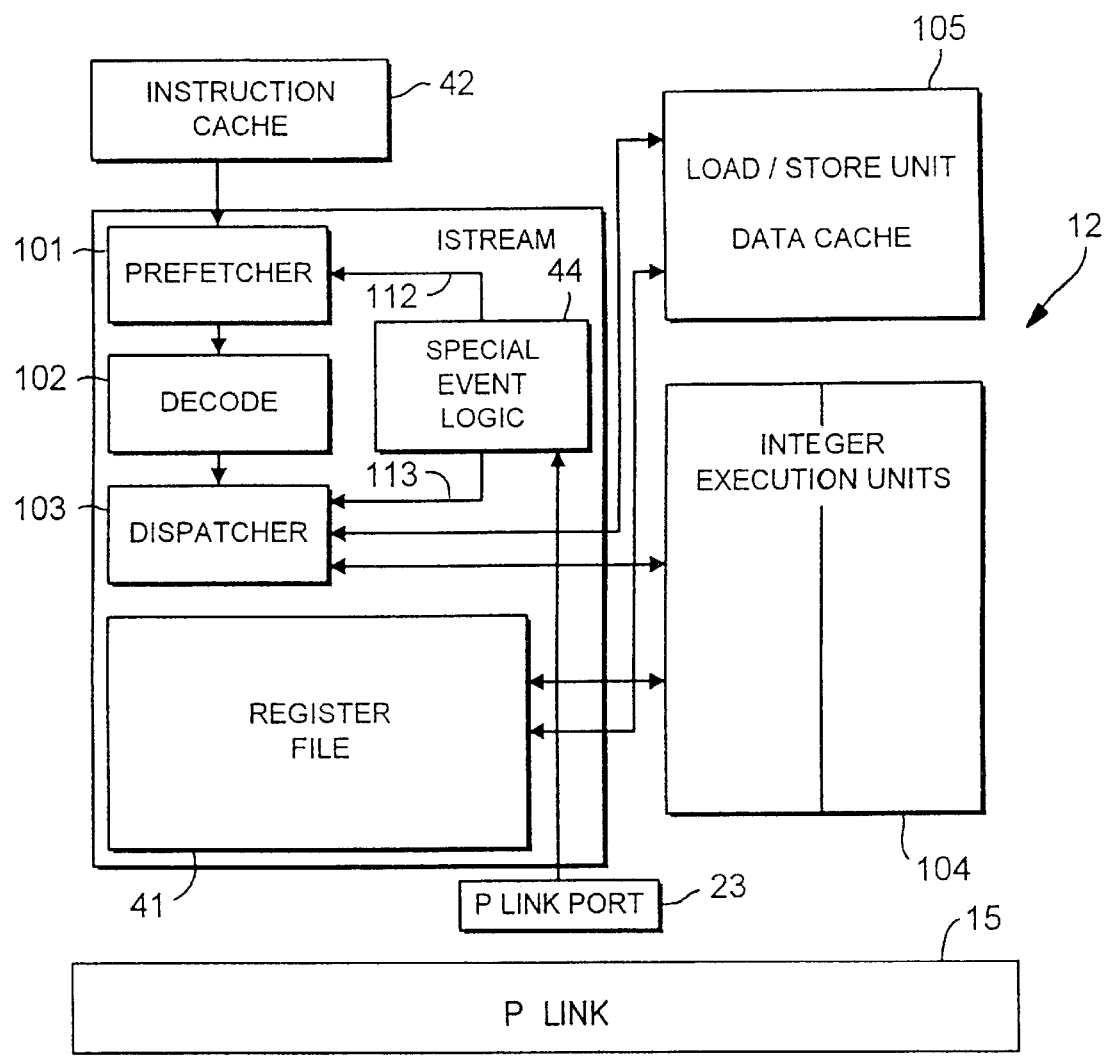
FIG. 9 illustrates further details of one CPU of the microcomputer of FIG. 1 including special event logic.

The instruction execution system for CPU 12 or 13 and its relation with the special event logic unit 44 will be described with reference to FIG. 9. In normal operations the CPU fetch and execute instruction cycle is as follows. A prefetcher 101 retrieves instructions from the instruction cache 42 and the instructions are aligned and placed in a buffer ready for decoding by a decode unit 102. The decode unit 102 standardises the format of instructions suitable for execution. A dispatcher circuit 103 controls and decides which instructions are able to be executed and issues the instructions along with any operands to the execution unit 104 or a load/store unit 105. The microcomputer chip of this embodiment has in addition the special event logic 44. This unit 44 can accept commands which originate from packets on the P-link system 15 through the interface 23 so as to override the normal instruction fetch sequence. On receipt of an "event suspend" packet the special event logic 44 will cause the prefetcher 101 to cease fetching instructions and cause the dispatcher 103 to cease dispatching instructions. The execution pipeline of instructions is flushed. A "event run" packet will cause the special event logic 44 to cause the prefetcher to resume fetching instructions provided the suspend pin is not asserted. In addition to stopping or starting normal execution instruction, the special event logic 44 can cause the "instruction stream" state to be reinitialised by a soft reset which is initiated by software when the chip is already running and resets only some of the state on the chip. Furthermore a packet can overwrite the register which holds the address on which code is fetched following a reset operation.

The special event logic 44 will now be described in greater detail with reference to FIG. 10.

Figure 10:
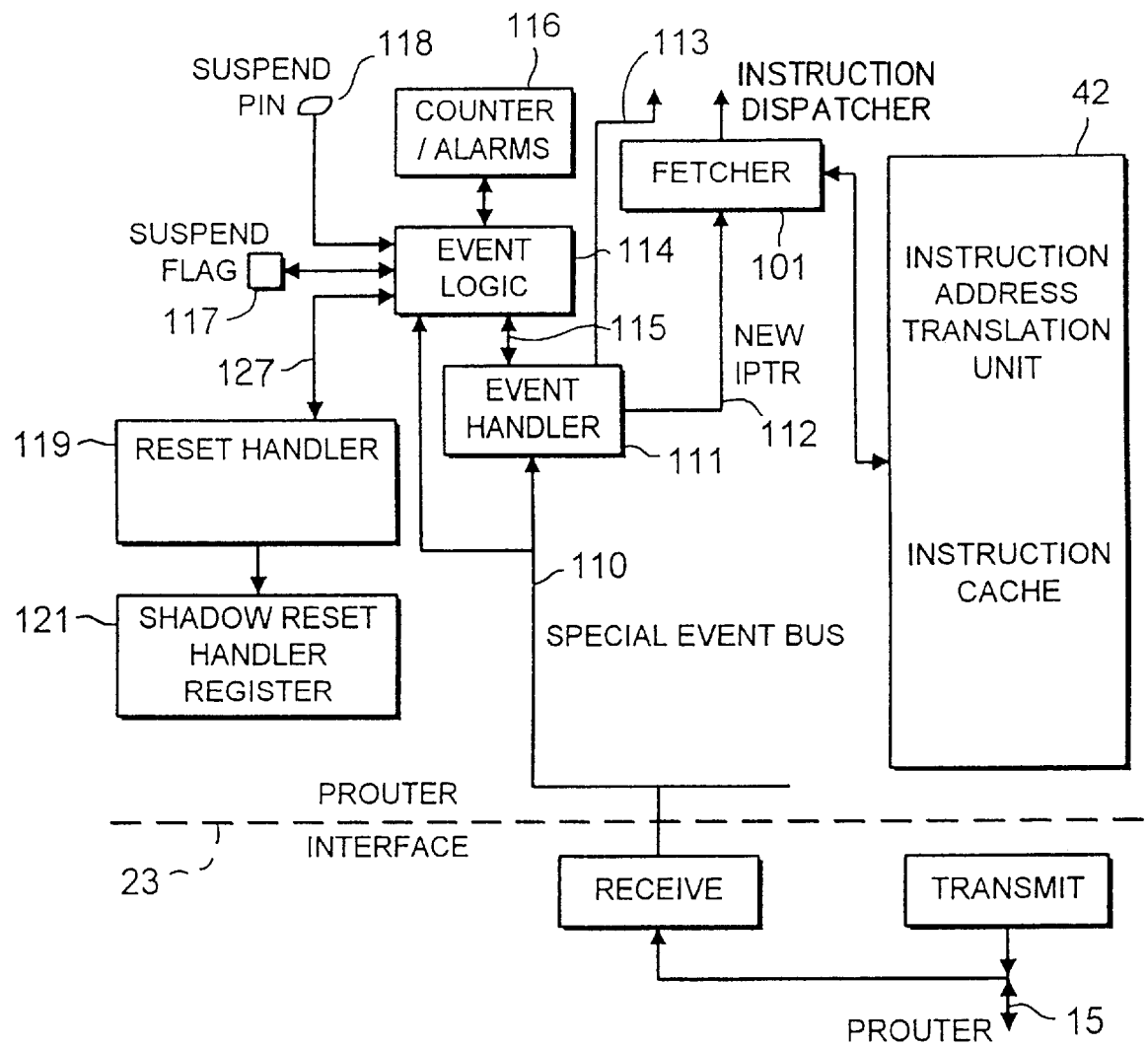
FIG. 10 shows further detail of the special event logic of FIG. 9.

FIG. 10 shows the special event logic 44 connected through the link interface 23 to the P-link system 15. As is shown in more detail in FIG. 10, the interface 23 is connected through a bus 110 to the special event logic 44 which comprises in more detail the following components. An event handler circuit 111 which is connected by line 112 to the instruction fetching circuitry 101 and by line 113 to the instruction dispatcher 103. The bus 110 is also connected to event logic circuitry 114 which has a bi-directional communication along line 115 with the event handler circuit 111. The event logic circuitry 114 is connected with a bi-directional connection to counter and alarm circuitry 116 as well as a suspend flag 117. A suspend pin 118 is connected to the event logic 114. A reset handler register 119 has a bi-directional communication with the event logic 114 along line 120. It is also connected to a shadow reset handler register 121.

The operation of the circuitry of FIG. 10 is as follows. An instruction may be executed on-chip or be derived from operation of circuitry on an external chip, which causes a packet to be transmitted on the P-link system 15 being a destination indicator identifying the module shown in FIG. 10. In that case the packet is taken through the interface 23 along bus 110 to the event handler 111 and event logic 115. The event logic to determine whether the special event is "event run" or "event reset" or "event suspend" or "event set reset handler".

On receipt of an "event suspend" the event logic 114 causes the suspend flag 117 to be set. The event logic 114 forms a logical OR of the state of the suspend flag 117 and the state of the suspend pin 118. The result is referred to as the suspend state. If the arrival of the "event suspend" has not changed the suspend state then nothing further is done. If the arrival of the "event suspend" has changed the suspend state then the event logic 114 inhibits the accessing of instructions from the cache 42, it does this by a signal to the event handler 111 which controls fetching of instructions by the fetcher 101 and the dispatch of instructions by the dispatcher 103. Instructions fetched prior to receipt of the "event suspend" will be completed but the CPU associated with the event logic 114 will eventually enter a state where no instructions are being fetched or executed.

On receipt of an "event run" the event logic 114 causes the suspend flag 117 to be cleared. The event logic 114 performs a logical OR of the state of the suspend flag 117 and the suspend pin 118. The result is known as the suspend state. If the arrival of the "event run" has not changed the suspend state then nothing further is done. If the arrival of the "event run" has changed the suspend state then the event logic 114 ceases to inhibit access of instructions from the cache 42. A signal passed through the event handier 111 indicates to the fetcher 101 that the CPU should resume its fetch-execute cycle at the point at which it was suspended.

In the event of receipt of an "event set reset handler" the event logic 114 causes the operand which accompanies the special event in the packet, to be copied into the reset handler register 119 and the previous value that was held in register 119 is put into the shadow reset handler register 121.

On receipt of an "event reset" the event logic 114 causes the event handier 111 to cease its current thread of execution by providing a new instruction point on line 112 to the fetcher 101 and thereby start executing a new instruction sequence whose first instruction is fetched from the address given in the reset handler register 199. That new address is obtained on line 120 through the event logic 114 to the event handler 111 prior to being supplied to the fetcher 101.

It will therefore be seen that by use of the special events which may be indicated in a packet on the P-link system 15, sources on-chip or off-chip may be used to suspend the fetching and execution of instructions by a CPU or to resume execution of a suspended CPU. It may also be used to reset a CPU into an initial state or to provide a new boot code for the CPU from anywhere on the P-link system or anywhere in an interconnected network using the external port 30 so that it forms part of the physical address space throughout the network which may be accessed by the CPU.

Figure 15:
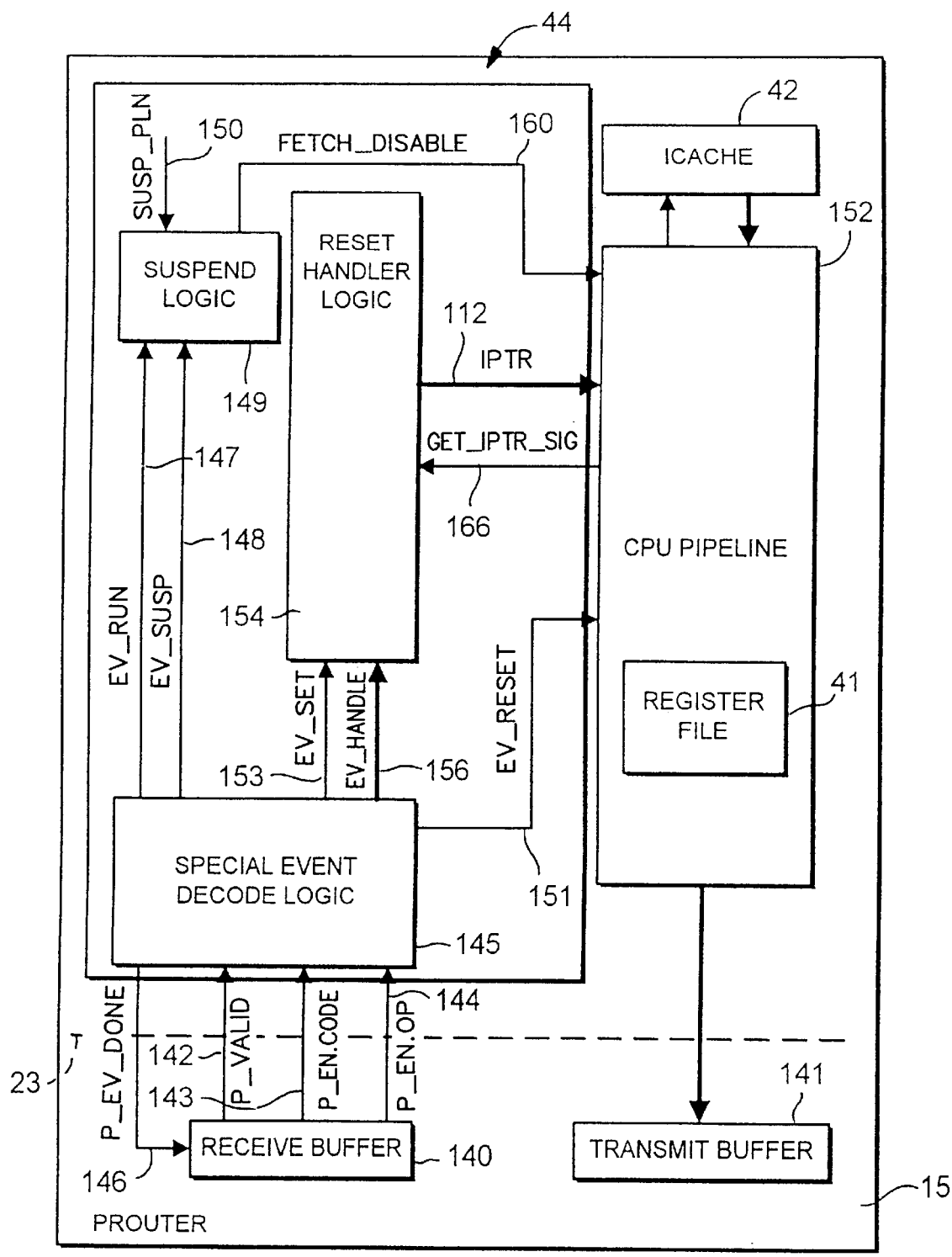
FIG. 15 shows more detail of part of the logic circuitry of FIG. 10.
Figure 16:
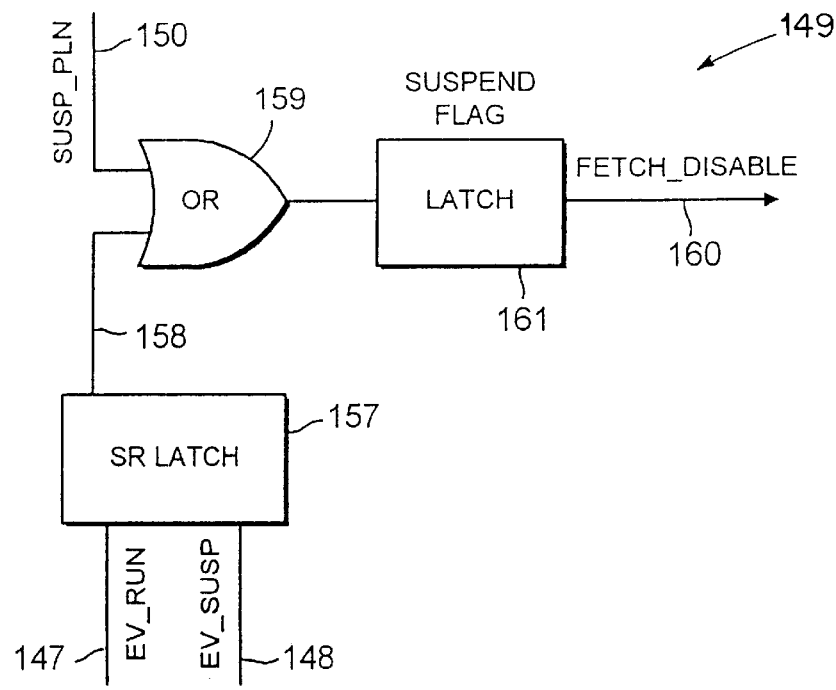
FIG. 16 shows more detail of part of the logic circuitry of FIG. 15.
Figure 17:
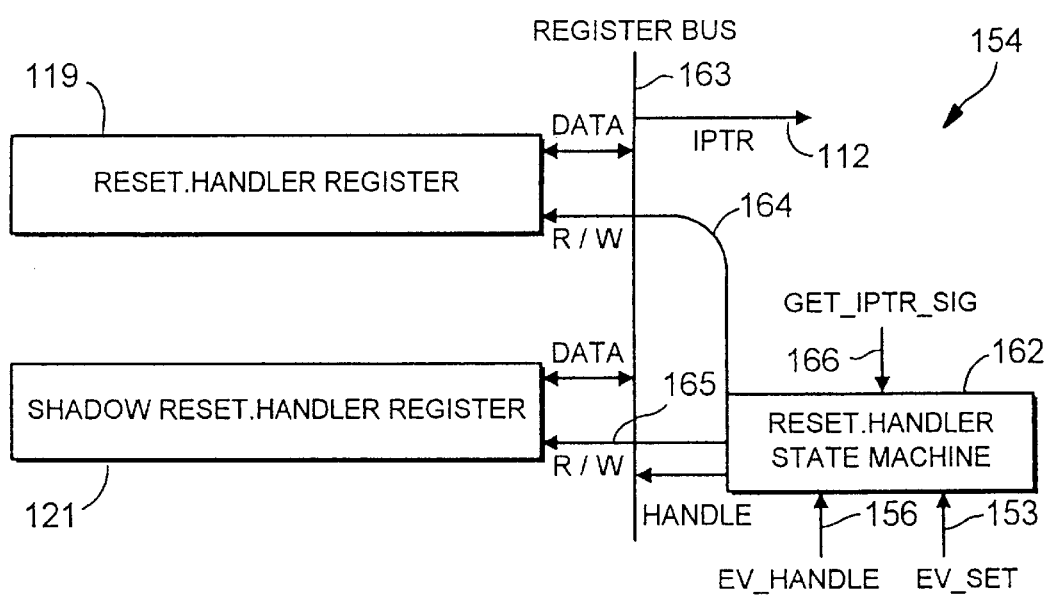
FIG. 17 shows more detail of another part of the logic circuitry of FIG. 15.

More detailed figures showing the special event logic 44 are provided in FIGS. 15, 16 and 17. FIG. 15 shows the P-link system 15 including a Receive buffer 140 and a Transmit buffer 141 adjacent the interface 23. When a packet including a special event is received in the buffer 140, inputs may be provided on lines 142, 143 and 144 to special event decode logic 145. When bit 15 of the event number is set to 1 thereby indicating a special event, a P valid signal is provided on line 142 to the decode logic 145. At the same time the event code field of the packet is supplied on line 143 to the decode logic 145 and the event operand field is supplied on line 144 to the decode logic 145. In response to assertion of the P valid signal on line 142, the decode logic 145 decodes the event code field as indicated in the following table:

| P_en.code | Signal asserted | Ev_handle |
|---|---|---|
| 001 | Ev_run | — |
| 011 | Ev_reset | — |
| 101 | Ev_Susp | — |
| 101 | Ev_set | P_en.op |

On the cycle of operations following decoding, the decode logic 145 outputs a signal on line 146 P Event done to clear the buffer 140. Depending on the result of decoding the signal on line 143, the decode logic may output either an Event Run signal on line 147 or an Event Suspend signal on line 148 to suspend logic 149 connected to the suspend pin by line 150. Alternatively decoding of the signal on line 143 may cause the decode logic 145 to output an Event Reset signal on line 151 to the CPU pipeline circuitry 152. Alternatively the decode logic 145 may output an Event Set Reset Handler signal on line 153 to the reset handler logic 154 together with the operand value on bus 156.

FIG. 16 illustrates the suspend logic 149. Lines 147 and 148 form inputs to an SR latch 157 which provides a second input 158 to an OR gate 159 having the suspend pin providing the other input 150. In this way the signal on line 147 is logically or-ed with the suspend pin to generate a fetch disable signal on line 160 which includes a latch 161 providing the suspend flag. The signal on line 160 has the effect of inhibiting the fetching of instructions from the instruction cache 42. This eventually starves the CPU of instructions and the CPU execution will be suspended. Assertion of the signal on line 148 will clear any previously asserted signal on line 147 in the normal operation of the SR latch 157.

FIG. 17 illustrates the reset handler logic 154. When the Event Set on line 153 is asserted, this is supplied to a reset handler state machine 162 connected to a register bus 163 interconnecting the reset handler register 119, shadow reset handler register 121 and the instruction pointer bus 112. The response to assertion of signal 153 is as follows:

1. The state machine 162 asserts the read line 164 of the reset handler register 119 which causes the value in the reset handler register to be read onto the register bus 163.
2. The state machine 162 asserts the write line 165 of the shadow reset handler register 121 causing the value on the register bus to be written into the shadow reset handler register.
3. The state machine 162 causes the value on the Ev_handle bus 156 to be put onto the register bus.
4. The state machine 162 asserts the write line 164 of the reset handler register 119 which causes the value on the register bus to be copied into the reset handler register 119.

Alternatively if a get_iptr_sig is asserted on line 166 from the CPU pipeline 152 then the following occurs. The state machine 162 asserts the read line (R/W) of the reset handler register which causes the value in the reset handler register to be read onto the register bus. This value is transferred along the line labelled IPTR.

Figure 11:
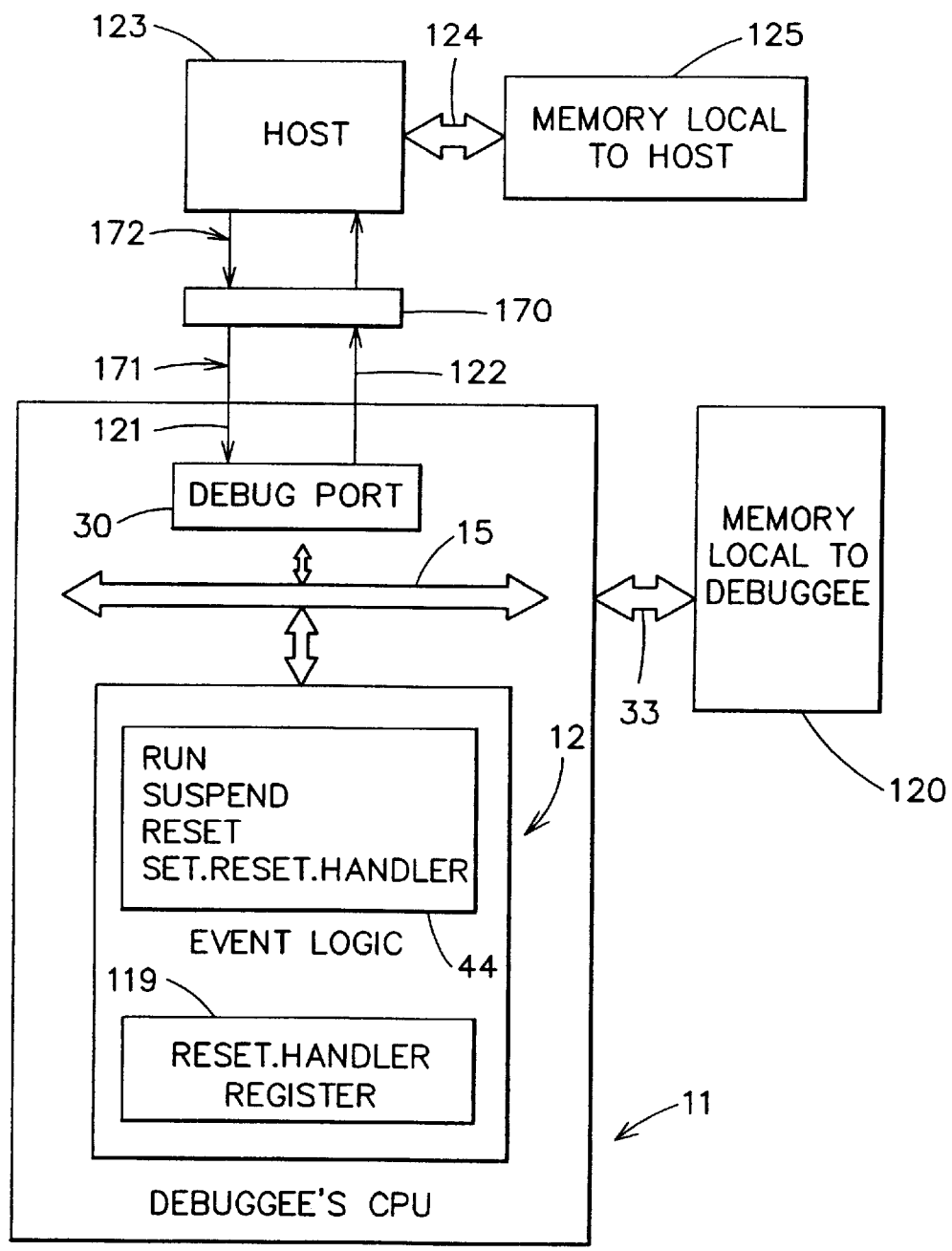
FIG. 11 shows a microcomputer of the type shown in FIG. 1 connected to a host computer for use in debugging the CPU by operation of the host.

FIG. 11 shows how the debug port can be used to connect a "debuggee" or "target" CPU 12 of the chip 11 to a "host" external computer 123 for debugging. (The same applies for CPU 13). The host is connected to the CPU via an adapter device 170. Between the adapter and the port 30 there is a bi-directional bit-serial link 171 using the serial protocol described above. The adapter contains processing means for translating between that protocol and a standard network or personal computer bus protocol (such as Ethernet or PCI bus) which is used over a bi-directional link 172 between the adapter and the host 123.

Figure 18:
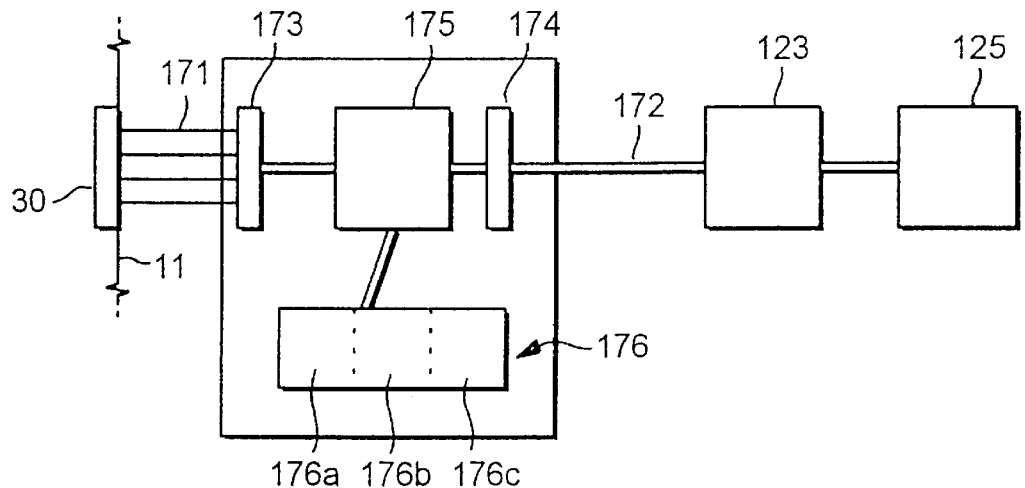
FIG. 18 shows in more detail the architecture of an adapter for connecting a host computer to the CPU.

FIG. 18 shows the adapter in detail. The adapter comprises an interface 173 for interfacing to the serial link 171 and in interface 174 for interfacing to the network protocol link 172. Between the interfaces 173, 174 is a CPU 175 which controls the operation of the adapter, including passing messages between the interfaces. The interfaces could be connected directly but providing a control unit allows more flexibility—for instance, it makes it easier to switch the interface 174 for one that uses another protocol. A memory 176 is connected to the CPU 175. For ease of description, memory 176 is shown as being divided into three segments 176a, b and c. Segment 176a stores instructions for the CPU 175. The CPU is capable of routing data between either of the interfaces 173,174 and the memory 176. As will be described below, this allows the CPU 175 to be programmed from the host 123 and allows instructions for the CPU 12 on chip 11 to be sent from memory 176 over serial link 171. Because the serial link 171 is in this example electrically fragile its length should be no more than 1.5 m for reliable communications. In contrast, in this example the network protocol link 172 is electrically robust and can sustain reliable communications over a greater distance. This makes it more convenient for a user of the host computer to make a connection to the on-chip CPU 12.

The following method may be used to boot one or other of the CPUs 12 or 13 of FIG. 1 when the chip is connected to an external microcomputer through the port 30 similar to the arrangement shown in FIG. 11. The two CPUs 12 and 13 may be connected to a common suspend pin 118. When pin 118 is asserted, after the hard reset pin 46 has been asserted, both CPUs are prevented from attempting to fetch instructions. The external link 30 and external microcomputer 123 can then be used to configure the minimal on-chip state by writing directly to control registers on chip 11 and storing the necessary boot code into the DRAM memory connected to bus 33 of chip 11. In this operation the CPU 175 of the adapter acts passively to relay data between the interfaces 173, 174. When the state of the suspend pin is changed one of the CPUs can boot from the code now held in the DRAM for the chip 11. To achieve this, the suspend pin 118 is changed to an assert state after a hard reset has been asserted. The external microcomputer 123 sends packets through the port 30 to write boot code into memory 120 shown in FIG. 11. The host 123 then executes an instruction to send the special event EVENT SET RESET HANDLER to the selected one of CPUs 12 or 13 and in this example it will be assumed to be CPU 13. This will provide a new target address in the reset handler register 119 for CPU 13. The host 113 will then execute an instruction to send through the port 30 a special event EVENT SUSPEND to the other CPU 12. This will set the suspend flag 117 of CPU 12. The assert signal on the suspend pin 118 is then removed so that CPU 13 will start executing code derived from memory 120 from the target boot address held in the reset handler register 119. CPU 12 will remain suspended due to the start of its suspend flag 117. When it is necessary to operate CPU 12, it can be started by CPU 13 executing an instruction to send to CPU 12 the special instruction EVENT SET RESET HANDLER. This will change the default boot address held in the reset handler register 119 of the CPU 12. CPU 13 must then execute an instruction to send the special event EVENT RUN to CPU 12 which will, as described above, start execution of CPU 12 with code derived from the address in the reset handler register 119 of CPU 12.

In this way the microcomputer of FIG. 1 can be booted without the requirement of having valid code in a ROM.

Although the above described boot procedure used boot code which had been loaded into the local memory 120 for the chip 11, the similar procedure may be followed using code located in a memory 125 which is local to the external microcomputer 123. To achieve this, the same procedure, as above, is followed except that the special event which is sent through port 30 to load the reset handler register 119 of CPU 13 will provide a target address for the boot code which is located in the address space of the port 30. In this way, when the assert signal is removed from the suspend pin 118, CPU 13 will start fetching code directly from the external computer and external memory. When CPU 12 is needed it can be started by CPU 13 as previously described.

In the example of FIG. 11, the chip 11 is shown for simplicity with the single CPU 12 as CPU 13 is not involved in the operation described with reference to FIG. 11. The chip is connected through the external memory interface and bus 33 to a memory chip 120 which is local to the CPU 12 and forms part of the local address space of the CPU 12. The port 30 is connected by two serial wires 121 and 122, which provide the link 171, to the adapter 170. The adapter is connected by link 172 to a further microprocessor chip 123 which in this case forms a debugging host for use with chip 11. Line 121 provides a unidirectional input path to chip 11 and line 122 provides a unidirectional output path to the host 123. Other formats, such as a nine-wire serial link, could be used, and in that case one or more of the wires could be connected directly to pins in the port 30, for instance to the suspend pin 118. The host 123 is connected through a bus 124 to a memory chip 125 which is local to the host microcomputer 123 and thereby forms part of the local address space of the host microcomputer 123. In order to carry out debugging operations on the CPU 12, the host microcomputer may operate software derived on-chip in the microcomputer 123 or from its local memory 125 so that the host 123 causes special events, as previously described, to be issued in packets along the serial line 121 through the port 30 onto the P-link system 15. These may have the destination address indicating the CPU 12 so that this special event is handled as already described with reference to FIG. 10. This may be used to suspend the CPU 12 at any time and to replace the value in its reset handler register and to reset the CPU 12 either from its previous state or from a new state indicated by the value in the register 119. The CPU 12 may have part of its address space located in addresses of the memory 125 local to the host 123. The port 30 forms part of the local address space for the CPU 12 and consequently a memory access may be made to the address space allocated to the port 30 and in this case the response may be synthesised by software running on the host microcomputer 123. It is therefore possible to set the reset handler register 119 to be an address local to the host rather than local to the CPU 12. In this way a host can, independently of operation of the CPU 12, establish itself as the source of the instructions and/or data to be used by the CPU 12. This mechanism may be used to initiate debugging from the host 123. In the case of a chip 11 having two CPUs 12 and 13, it is possible to debug software running on CPU 12 as already explained while leaving software running on CPU 13 unaffected by the debug operation being carried out on CPU 12. This is the position shown in FIG. 12 where the second CPU 13 is shown in broken lines and is operating normally in obtaining instructions from its instruction cache or from the memory 120 quite independently of the debug routine operating on CPU 12 in conjunction with the host 123.

When the CPU 12 is fetching code from the memory 125 of the host by accessing the memory addresses allocated to the port 30 the CPU 175 of the adapter can act passively just to relay data between the interfaces 173, 174. An alternative solution is for the code to be stored in the memory 176b of the adapter and for the CPU 175 to relay data from the memory 176b to the interface 173. In the latter solution the code is preferably stored first in the memory 176b by transfer of data from the memory 125 of the host to the memory 176b of the adapter. Because the link 172 typically has a higher latency than the link 171 this can speed up the fetching of the code by the CPU 12. However, significant advantages can be obtained if the CPU 175 takes a more active role.

Figure 19:
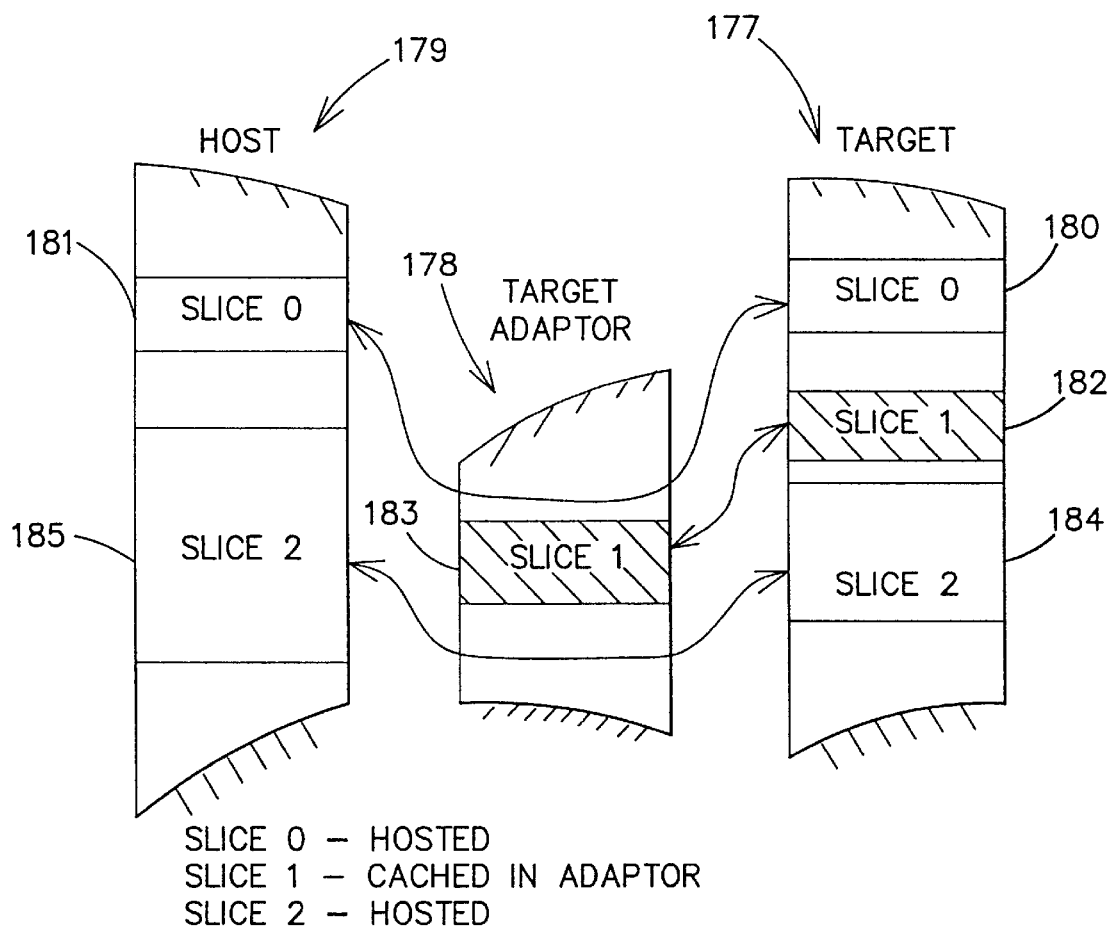
FIG. 19 shows the arrangement of memory slices.

The CPU 175 preferably acts actively to route data to the interface 171. The memory 176c stores pointer data which defines which memory addresses in the memory 176 and the memory 125 correspond to memory addresses that are assigned on the chip 11 to the port 30. In other words, the data in memory 176c act as pointers from memory addresses assigned to the port 30 to target memory addresses in memories 125 and 176. When the CPU 175 receives a fetch request from the CPU 12 specifying a memory address assigned to the port 30 the CPU 175 determines which memory address in memory 176 or 125 corresponds to that port address, fetches data from that target address, and provides it to the CPU 12 over link 171. FIG. 19 illustrates this scheme. FIG. 19 shows three memories illustrated as columns. Column 177 represents the memory addresses allocated to the port 30. Column 178 represents the memory 176. Column 179 represents the memory 125. Three slices of the memory addresses 177 are defined in the memory 176 to map on to slices of memory addresses in the memories 125 and 176. Slice 0 (at 180) maps on to a slice 181 in memory 125. Slice 1 (at 182) maps on to a slice 183 in memory 176. Slice 2 (at 184) maps on to a slice 185 in memory 125. When the CPU 12 fetches data from a memory address in slice 0 the CPU 175 of the adapter interprets the fetch, fetches data from the corresponding address from slice 181 in the memory of the host and provides that data to the CPU 12 over link 171. The data of slice 1 is cached in the memory 176 local to the adapter, so when the CPU 12 fetches data from a memory address in slice 1 the CPU 175 interprets the fetch and provides data from the appropriate local address. This sliced memory scheme provides a number of advantages:

1. Since the host 123 can write to the memory 176 the sliced memory scheme allows for improved performance, especially when the CPU 12 is executing a block of code from the memory 125. The data from the slice of memory 125 that stored the code can be copied to a slice in the memory 176b. Then the definition in memory 176c of the location of the slice can be set to point to the slice in memory 176b. Because the code can now be accessed locally in the adapter it can be fetched more quickly by the CPU 12, without the need to pass the data over the relatively high latency link 172 in response to a fetch from CPU 12.

2. The memory available in the adapter may be kept relatively small. In particular, the adapter need not provide all the memory locations allocated to the port 30. Therefore, the cost of the adapter can be kept low.

3. By merely changing the pointers in memory 176*c* slices of memory addresses 177 can be mapped on to data at new target memory locations without changing the contents of the target memory locations.

The operation of the adapter has been described above with reference to fetch instructions from CPU 12 to read data through the port 30. Analogous operations apply for writing or swapping data.

When the adapter receives a packet, for example requesting access to memory, the adapter or the host can use the source identifier 99 of the packet to determine the source of the packet. This is useful because in monitoring chips that comprise more than one CPU core mapped into a common memory system. The system is thus scalable to support multiple on-chip CPU cores.

It is clear from FIG. 19 that not all of the memory addresses assigned to the port 30 need to be mapped on to a target address in memories 125 or 176. The memory addresses that have no corresponding target stored are referred to collectively as the default slice. If the CPU 175 receives a request from the CPU 12 to access an address in the default slice it causes the interface 174 to pass the request to the host 123. The request is passed in a form that includes the low-level protocol information from link 171 that framed the request, so that the request can be analysed in full at host 123, for instance for debugging purposes. Alternatively, when an attempt is made to access the default slice the adapter could just send an error signal to the host 123.

The CPU 175 is controlled by software stored in memory 176*a*. The software defines not only how the CPU 175 is to interpret the pointer data stored in memory 176*c* but also how the CPU 175 is to perform several other functions. These include monitoring the state of the target CPU(s) 12,13: the CPU 175 controls the suspend pin 118, lock states (so as to enable linking of software in the target CPU and the host 123) and opcode watching (see below). The CPU 175 continuously looks for requests from the host 123 to (for example) apply data to the target CPU, reset the target CPU, read or write to the on-board memory of the chip 11, or read or write to the memory 176. To allow the adapter to boot easily, at least part of the memory 176*a* may be provided as non-volatile memory.

By arranging for the host 113 to send the special instruction EVENT SUSPEND to CPU 12 prior to removing the assert signal from suspend pin 118 it is possible to reduce the amount of instruction fetching through the port 30 since CPU 13 may boot alone and then arrange for CPU 12 to boot rather than attempting to boot both CPUs 12 and 13 from the external microcomputer through the port 30.

Each slice may include a one memory address or number of contiguous or non-contiguous memory addresses. However, for ease of use and economy of storage in memory 176*c*, where the pointers are stored, all the defined slices (i.e. all the slices apart from the undefined default slice) preferably include a number of contiguous memory addresses. Each slice is defined in memory 176*c* as a top address and a bottom address in the range of addresses 177, data indicating whether the slice is modelled in memory 125 or memory 176 and data giving the read and write permissions for the slice (e.g. the CPUs 12 and 13 will typically not be given write access to code in memory 176*b* which they are to execute). For addresses in memory 176 the memory 176*c* also stores data defining of the lowest address of the slice. For addresses in memory 125, a similar mapping is stored in memory 125 to allow the host 123 to translate between an address in the range 177 and an address in memory 125. To make use of the read/write data, when a CPU 12,13 requests an access to data in any of the slices the CPU 175 first checks whether an access of that type to that data is permitted. Addresses in memory 125 or 176 for the data of the lowest address of a slice may be stored as an address local to host 123 together with a flag to indicate that the address is in memory 125 not memory 176; alternatively the memory addresses for memories 125 and 176 may be defined so as not to overlap, so they form notionally the same memory space.

The target locations of the slices need not be limited to memories 125 and 176. The adapter could include an interface to another host whose memory could be accessed, or an additional host could be connected to interface 174 or to host 123, which could facilitate access to the memory of the additional host.

Other on-chip modules than the CPUs could access the memories 125 and 176 in the way described above. Such modules could be interfaces etc.

Watchpoint registers may be used to monitor the execution of a program. These registers may be used to initiate a debug routine when a particular memory store is addressed or alternatively when instructions from a particular location are executed.

Various examples of use of the chip 11 in a network having a plurality of interconnected chips are shown in FIGS. 11 to 14.

Figure 12:
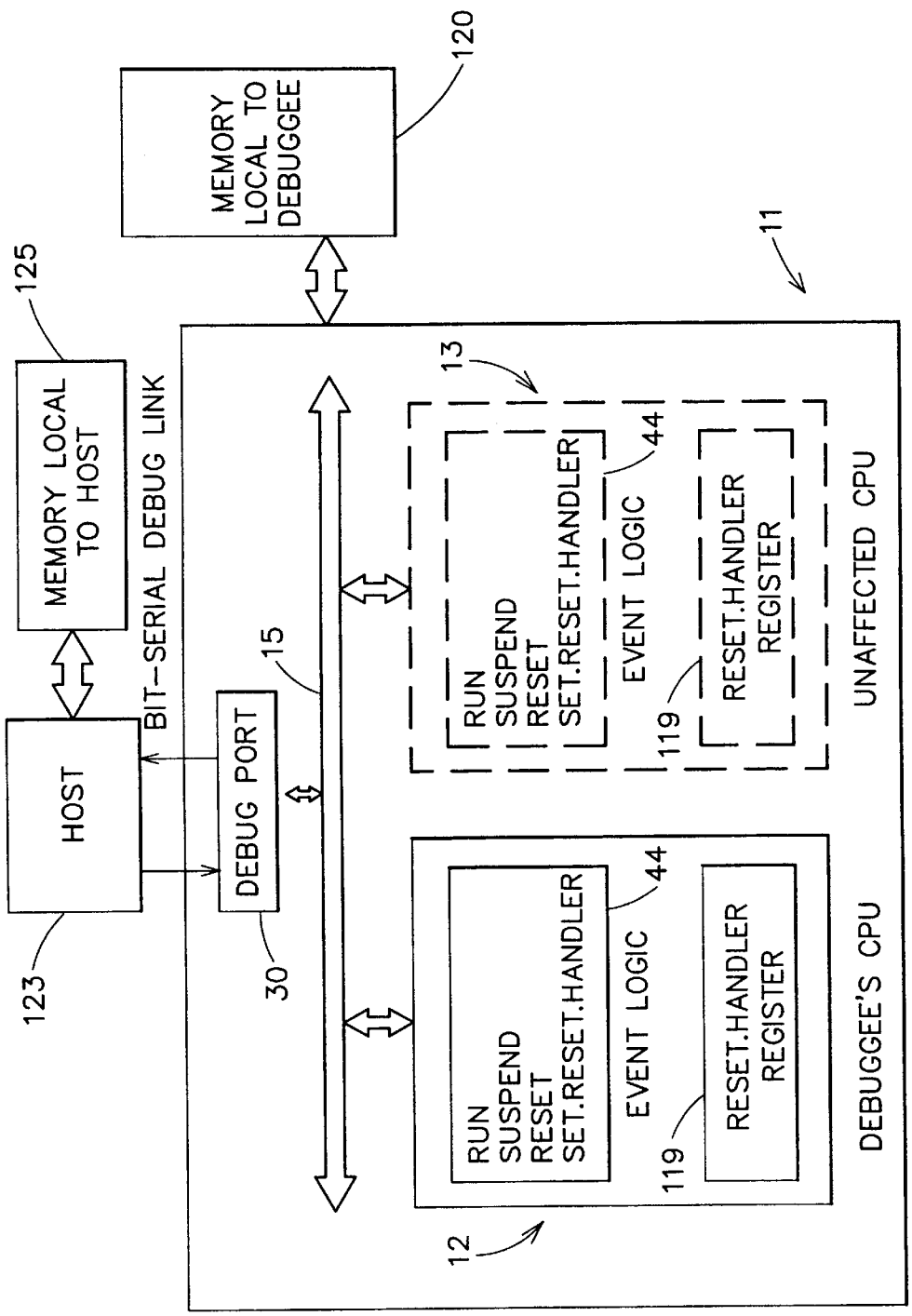
FIG. 12 shows an arrangement similar to FIG. 11 in which a second CPU is provided on the same chip and operates normally while the other CPU is debugged by the host.
Figure 13:
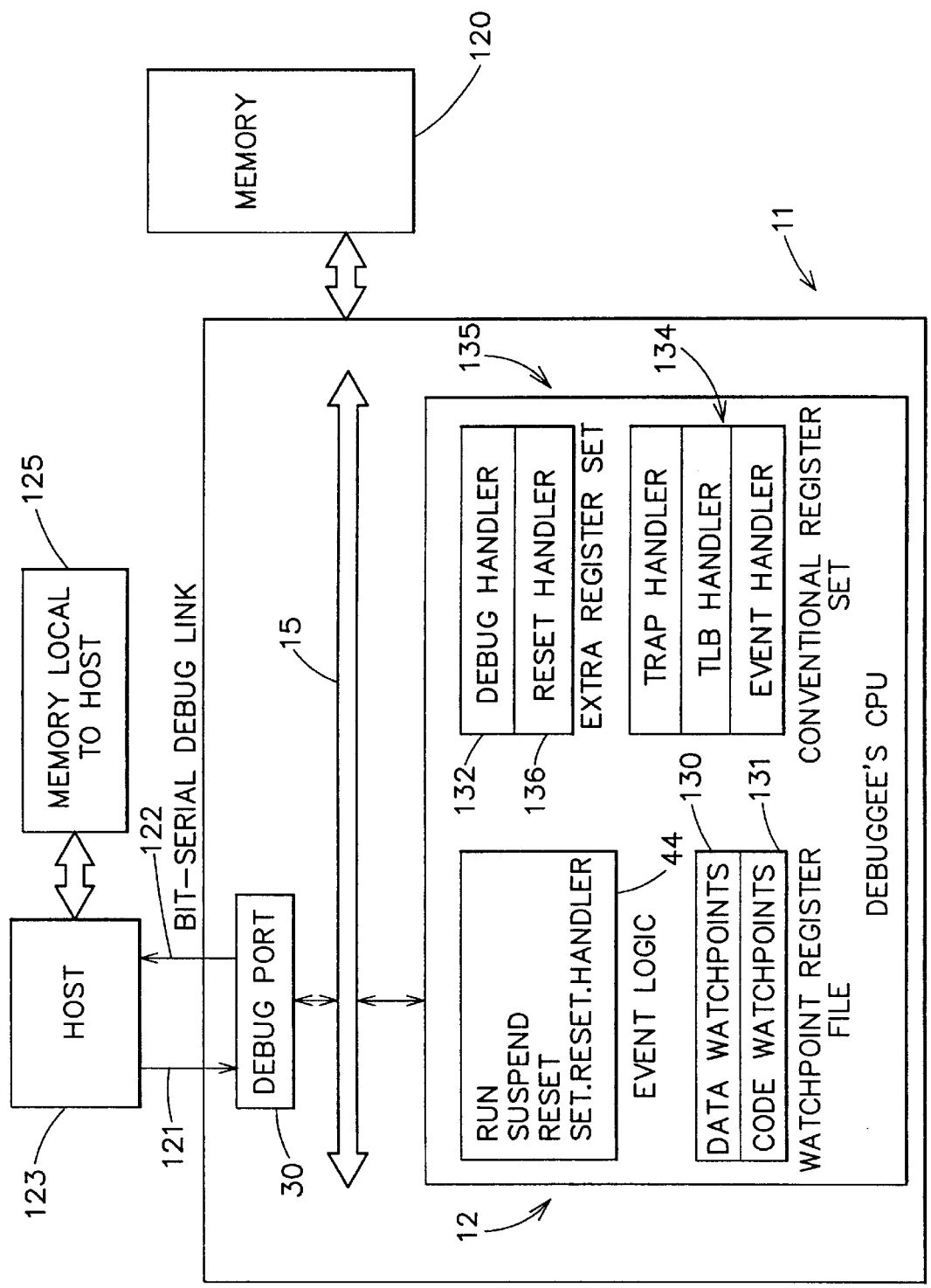
FIG. 13 illustrates one CPU forming part of a microcomputer as shown in FIG. 1 when connected to a host computer for use in watchpoint debugging.

FIG. 13 shows an alternative arrangement in which the network is generally similar to that described with reference to FIGS. 11 and 12. However in this case the CPU 12 is provided with a data watchpoint register 130 and a code watchpoint register 131 in which respective addresses for data values or instruction locations may be held so as to initiate a debug routine if those watchpoints are reached. In this example, the host microcomputer 123 can, at any point during the execution of a program by the CPU 12, briefly stop execution of the CPU 12 and cause the watchpoint state in the registers 130 or 131 to be modified and return control to the original program of the CPU 12. When the CPU 12 executes an instruction which triggers a watchpoint as set in either of the registers 130 or 131, it stops fetching instructions in its normal sequence and starts fetching and executing instructions starting from the instruction specified by the content of a debug handler register 132. If the debug handler register 132 contains an address which is local to the host 123 rather than local to the CPU 12, the CPU 12 will start fetching instructions from the host 123. In this way the host can establish the watchpoint debugging of a program which is already running without using any of the memory local to the CPU 12 and without requiring the program of the CPU 12 to be designed in a manner co-operative to that of the debugging host 123. In this way the examples described provides for non-co-operative debugging. The operating system and application software for the CPUs on the chip 11 do not need to have any knowledge of how the debugging host computer 123 will operate or what operating system or software is incorporated in the host 123.

Another use of the adapter 170 and the host 123 is in the debugging of the interaction between CPUs 12, 13 and hardware interfaces such as interfaces 25,28 and 35 in FIG. 1. To debug any of the interfaces the P-link can be re-configured to direct communications to that interface from a target CPU to the port 30 instead of the interface in question. From the port 30 the communication passes to the adapter 170 and (optionally) the host 123. The host and/or the adapter can log the communications and simulate the response of the actual interface. This makes use of the packetised nature of the P-link and the capabilities of the port 30 and the associated off-chip hardware to avoid the need for additional device manager hardware on-chip to intercept communications to the interface.

The P-link can easily be reconfigured to specify that certain addresses that are allocated to the port 30 correspond to the hardware interface that is being debugged. This can be done by way of a memory mapping, either explicitly or by using the TLB of the target CPU to translate addresses of the real hardware device, or its interface, to addresses allocated to the port 30. Software in the memory 176a or in the memory 125 then allows a respective processor of the adapter 170 or the host 123 to model the performance of the real hardware and the corresponding interface and to respond to the CPU via the port 30 in the same way as the real interface would. For example, if the interactions with the video interface 25 are being debugged the host 123 could model the behaviour of the interface's video memory by defining part of the host's memory as a slice to correspond to the real video memory and receive and transmit write and read video data. Because the modelling is handled off-chip it is relatively straightforward to observe and debug the hardware interactions of the CPU. In more complex hardware interactions, where the real hardware interprets a read or write instruction as an instruction to perform an action outside the memory the host 123 may have to react less passively to read or write instructions. In For example, it may have to produce a stream of data to simulate keyboard input.

Another advantage of this approach is that it allows the CPU's hardware interactions to be debugged even before the real hardware has been built, provided the interface of the real hardware has been specified sufficiently to allow it to be simulated by the host 123 or the adapter 170. Also, many common hardware devices such as UARTs or Ethernet interface chips contain large amounts of state which can be written to but not read, making it difficult to debug a CPU's interactions with such devices. In the system described above, the internal state of the software model of the hardware can easily be inspected using the host 123 and this debugging process is made much easier.

In conventional computer architectures watchpoint triggers are handled using a vector common to traps or events managed by the operating system. These traps and events use a conventional set of registers marked 134 which provide the address of the handler routine. In the example described, an extra register set 135 is provided which includes the debug handler register 132 and a reset handler register 136. In this manner independence from the operating system is established by providing the extra register set 135 in which the address of the handler routine for watchpoint handling routines may be found.

Figure 20:
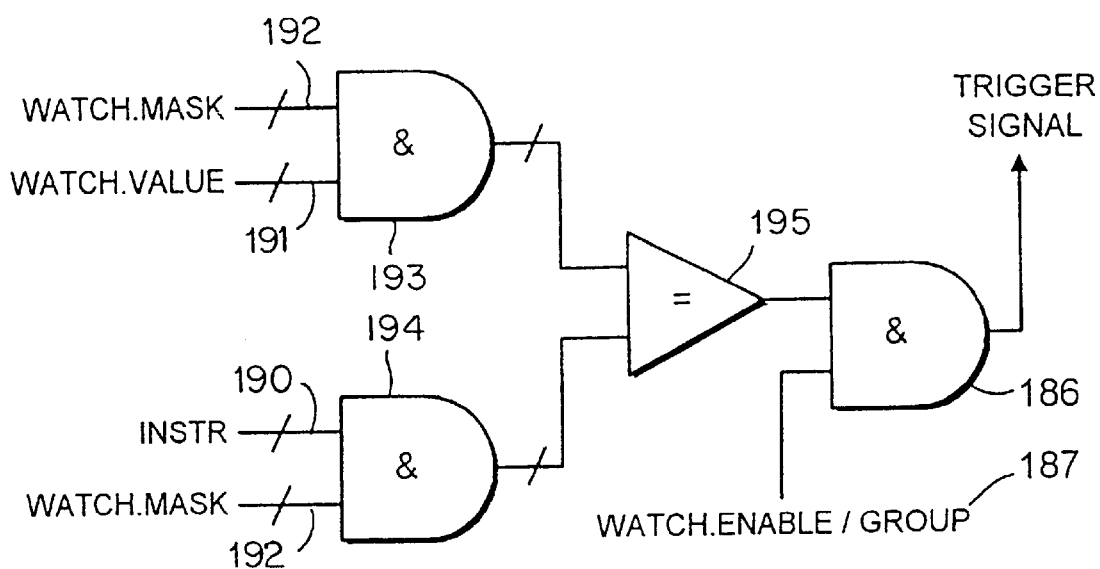
FIG. 20 shows architecture for monitoring instructions executed in the CPU.

A further enhancement is provided by the circuit shown in FIG. 20, which implements opcode watching in the CPU 12. The circuit shown in FIG. 20 continually monitors the instruction line input INSTR 180 to the execution units of the CPU 12 and using logic gates makes a bit-wise comparison of the instruction line with data stored in instruction watchpoint register 181 and mask register 182 to determine whether to trigger a watchpoint. The instruction line is monitored at the output of the instruction dispatcher (at 188 in FIGS. 9 and 10). Instruction register 181 stores a target instruction code WATCH.VALUE. Mask register 182 stores a mask WATCH.MASK whose bits have the value 1 if the corresponding bit in the code defined by WATCH.VALUE is to be watched for and 0 if the bit is not significant to the watch. Registers 181 and 182 are as wide as the widest instruction available in the target CPU: in this case 32 bits. AND gate 183 performs a bit-wise AND operation on WATCH.VALUE and WATCH.MASK to mask WATCH.VALUE with WATCH.MASK. This AND operation needs only to be performed once for a pairing of WATCH.VALUE and WATCH.MASK. The result could be stored in a temporary register. Meanwhile, AND gate 184 performs a bit-wise AND operation on INSTR and WATCH.MASK to mask each successive INSTR with WATCH.MASK. Then the outputs of gates 183 and 184 are compared at gate 185 to yield a 1-bit output. If the two outputs are equal then a true (1) signal is output from the gate 185. Gate 186 then ANDs the output from gate 185 with a 1-bit WATCH.ENABLE/GROUP signal (derived from register 187), which in this example indicates whether watching for instructions defined by the combination of WATCH.VALUE and WATCH.MASK is enabled. If the output from the gate 185 and the WATCH.ENABLE/GROUP signal are high then a trigger signal is output from the circuit. The trigger signal is sent to the event logic unit (114 in FIG. 10) and treated in the same way as an output from the other watchpoint systems described above. For example, it could raise a debug trap handler, decrement a counter (which could raise the debug trap handler when it reached zero) or issue a datagram containing a compressed form of the current value of the CPU's instruction pointer when the triggering instruction occurred to the adapter 170. The latter action could allow the host (when it received the datagram) to read the compressed pointer value and provide that information to a debugging tool. The datagram could also contain an indication of the time when the triggering instruction occurred, to help with software optimisation.

Rather than watching for actions being carried out on specific memory locations this watching scheme allows specific actions and classes of actions to be watched for using the opcode instruction data itself. When all the bits of WATCH.MASK are set to 1 this scheme watches for execution of instructions identical to that defined by WATCH.VALUE. However, if one or more of the bits of WATCH.MASK are 0 the scheme watches for instructions that are merely similar to that defined by WATCH.VALUE. This is especially powerful if the CPU's instruction set is defined in a regular format. For example, a 16-bit instruction may be arranged in 3 fields. The first 4 bits defining the operation that is to be performed, the next 6 bits defining a first register to be used by the instruction and the final six bits defining a second register to be used by the instruction. By setting WATCH.MASK to 1111 0000 0000 0000 in order to mask all but the first 4 bit field of WATCH.VALUE the watching scheme can be used to watch for all instructions having the same operation as the instruction defined by WATCH.VALUE. By setting WATCH.MASK to 0000 1111 1100 0000 in order to mask all but bits 5 to 10 of WATCH.VALUE the watching scheme can be used to watch for all instructions using the same first register as the instruction defined by WATCH.VALUE. Provided read and write instructions have the same format this allows both such instructions to be detected when they accessed the selected register. Other examples could involve masking all but two fields and/or masking parts of fields.

FIG. 22 shows examples of regular instruction formats, indicated by numbers 0 to 9. The format described above is number 1 in FIG. 22. The meanings of the abbreviations in FIG. 22 are as follows.

| Abbreviation | Meaning | Length (bits) |
|---|---|---|
| OP | Opcode | 4 |
| Fa, Fb, Fc | Opcode extension | 2, 6 or 10 |
| Ra, Rb, Rc, ra, rb, rc | Register number | 2, 3 or 6 |
| RB | Register block number | 4 |
| c | Register definition bit | 1 |
| Ca, Cb, Cc, Cd | Constant | 10, 12, 16, 26 |

Other advantages are available in a CPU running a real time operating system (RTOS), which allows multi-tasking by time-slicing multiple concurrent threads on the CPU. Normally, it is not possible to watch for instructions that are specific to a single thread because traditional watchpoint/instruction tracing facilities are implemented in hardware that does not interact with the RTOS and hence watchpoint facilities are global to the whole target CPU. In the present system a test for a certain thread could be conducted and the result applied as an input to gate 186 (via the WATCH. GROUP value of 187).

The CPU 12 may include several WATCH.VALUE, WATCH.MASK and WATCH.ENABLE/GROUP registers and several circuits as shown in FIG. 20 operating in parallel to allow several different opcode watches to be carried out simultaneously. One especially useful operation using two watches is to report to the host unit the value of the instruction pointer whenever a branch (for instance a jump or return) instruction is executed. This provides an efficient way of monitoring program flow. Similar circuitry is provided in CPU 13.

Figure 14:
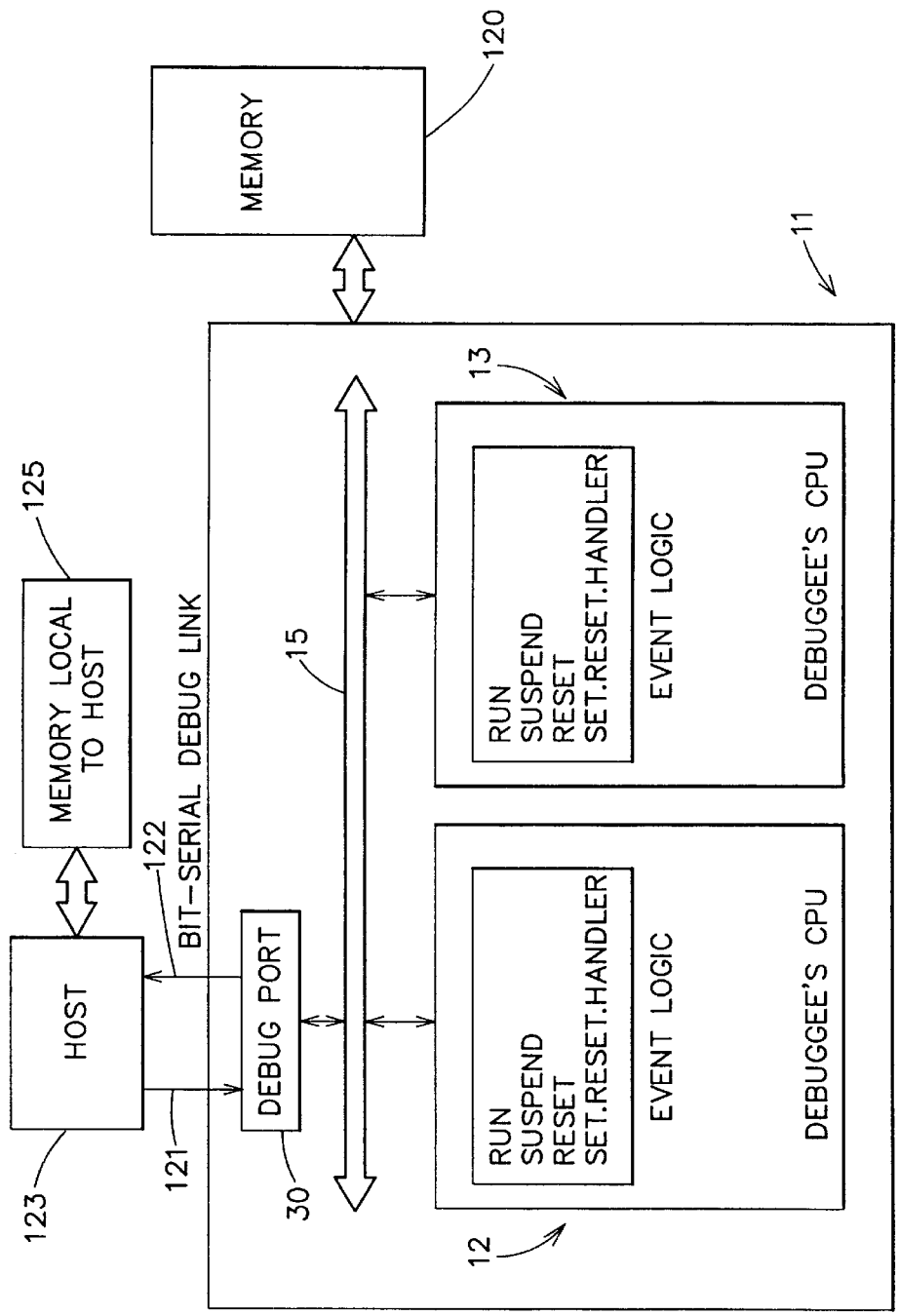
FIG. 14 shows a microcomputer of the type shown in FIG. 1 connected to a host computer in which one CPU on the microcomputer is debugged by the other CPU on the same chip.

FIG. 14 shows the same network as previously described with reference to FIG. 12. In this case the host 123 is provided and connected to the port 30 so that it may operate as previously described for use in debugging and the transmission of special events through the port 30. However in cases where it is necessary to monitor the debugging of one of the CPUs 12 or 13 as quickly as possible in debugging real time code, this example may be used to carry out debugging of one of the CPUs 12 or 13 by use of the other of the CPUs 12 or 13 instead of the host 123. The transfer of packets along the P-link 15 on-chip may be performed faster than external communications through the port 30. In this case either of the CPUs 12 or 13 may execute instructions which send special events to the other CPU on the same chip and thereby carry out a debugging operation as previously described with reference to use of the host 123 although in this case the control will be carried out by one of the on-chip CPUs in effecting a debugging operation of the other CPU on the same chip.

It will be seen that in the above example the external host 123 can be used to carry out debugging of either of the on-chip CPUs 12 or 13 without restrictions on the operating systems or application software of either of the on-chip CPUs. The watchpoint debugging may be carried out without the need to use memory local to the on-chip CPUs. Both on-chip CPUs 11 and 12 and the host 123 which is externally connected have access to each other's state by packet communications through the port 30. The on-chip CPUs 12 and 13 can access the external memory 125 independently of any operation of a CPU in the host 123. This allows the on-chip CPUs to access code from a memory which is local to an externally connected microcomputer.

As mentioned above, interrupts in the present microcomputer are implemented in the same fabric as the memory. Interrupts are dealt with as packets on the P-link. When the adapter is connected to the debug port it can insert packets on to the P-link. The adapter (possibly under the control of CPU 123) can thus insert on to the P-link packets which represent interrupts for CPUs 12 and 13 and any other devices that can receive interrupts.

Each CPU or other device to which an interrupt event can be sent has 32 virtual interrupt pins to which events and data from counters can be assigned. Each interrupt event can be specified as being edge triggered (either rising edge or falling edge) or level triggered (where level is low or high) from the state of one of the virtual interrupt pins. Six bits of the event number operand of the interrupt event instruction are used to specify these details. Bits 0 to 4 specify the number of the virtual interrupt pin and bits 5 and 6 specify the type of triggering.

To generate a packet indicative of an interrupt event the two 64 bit operands of the interrupt event instruction are copied by the adapter into packet buffer 51 together with three bytes: an opcode byte (which, as described above, indicates that the packet is an event request), a TID byte and a source byte. The source byte identifies the origin of the interrupt. The source byte can be set by the adapter to a desired value to simulate an interrupt from any source. The interrupt's destination unit cannot distinguish such a "fake interrupt" from one that is genuinely produced by the indicated source. Therefore, the interrupt can simulate an interrupt from a piece of hardware for debugging purposes.

The timing of the interrupt packet is also under the control of the CPUs 123, 175. The packet can be inserted on to the P-link at a desired moment, for example to allow a timing-related debugging problem to be investigated. Software in the memory 176 of the adapter may allow insertion of interrupt packets on to the P-link to be semi-automated. For example, the software may allow a packet to be inserted at predetermined time intervals (e.g. "every N milliseconds").

This interrupt arrangement is very useful in the debugging of interrupt-driven code running on the CPUs 12, 13. There is no need for a dedicated physical connection for interrupts, as there is in systems which rely on a direct link between a debugging system and an interrupt pin on the target computer. Other systems allow interrupts to be provided by internal units in the target system—for example from a real time clock or from one CPU in the target to another; but until the target system has been debugged these units cannot be relied upon to operate correctly. Another problem with prior art systems is that it is difficult to manipulate hardware units (such as real time clocks) to simulate predictably all the relative timings that may have to be tested.

The external host may comprise a computer, such as a standard personal computer or workstation, or a computer device such as a programmable logic array.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

What is claimed is:

1. An adapter for assisting debugging of a microprocessor on a single integrated circuit chip, the integrated circuit chip comprising an on-chip CPU with a plurality of registers, a communication bus providing a parallel communication path between the CPU and a first memory local to the CPU, and an external communication port connected to the bus on the integrated circuit chip, the external communication port having an internal connection to the bus of an internal parallel signal format and an external connection to the adapter of a first external format less parallel than the internal parallel format, the adapter comprising:

a first communication unit for connection to the external communication port with the first external format;

a second communication unit for connection to an external computer with a second external format having a higher latency than the first external format;

a second memory local to the adapter; and a processing unit local to the adapter and operable: (a) in a first mode to translate between the first external format and the second external format to allow the external computer to communicate directly with the external communication port; (b) in a second mode to connect the second communication unit to the second memory to allow the external computer to access the second memory; and (c) in a third mode to execute instructions stored in the second memory to transmit data via the first communication unit to the external communication port.

2. An adapter as claimed in claim 1, wherein the external communication port forms part of a memory address space of the CPU.

3. An adapter as claimed in claim 2, wherein the second memory forms part of the memory address space allocated to the external communication port.

4. An adapter as claimed in claim 3, wherein the adapter stores data specifying the mapping of the memory address space formed by the external communication port on to the memory address space in the second memory.

5. An adapter as claimed in claim 2, wherein the external computer has a third memory which forms part of the memory address space allocated to the external communication port and the adapter stores data specifying the mapping of the memory address space formed by the external communication port on to the memory address space in the third memory.

6. An adapter as claimed in claim 1, comprising a third communication unit for connection to a second external computer with the second external format, and wherein the processing unit local to the adapter is operable to allow the second external computer to communicate directly with the external communication port.

7. An adapter as claimed in claim 1, wherein the processing unit local to the adapter is operable to monitor continuously for asynchronous data provided to the external communication port by the CPU.

8. An adapter as claimed in claim 1, wherein the second external format has a lower data rate than the first external format.

9. An adapter as claimed in claim 1, wherein the second external format has a higher-level protocol than the first external format.

10. An adapter as claimed in claim 1, wherein the CPU includes circuitry for generating bit packets including a destination identifier within each packet, and the processing unit local to the adapter is operable to translate the bit packets between the internal parallel format and the first external format while retaining identification of said destination identifier.

11. An adapter as claimed in claim 10, wherein the processing unit local to the adapter is operable to translate the bit packets between an on-chip bit parallel format and an external bit serial format.

12. An adapter as claimed in claim 1, wherein the second memory stores software for execution by processing unit local to the adapter in a debugging routine for the CPU.

* * * * *